(12) United States Patent
Tanaka et al.

(10) Patent No.: US 7,535,345 B2
(45) Date of Patent: May 19, 2009

(54) VEHICULAR ANTI-THEFT SECURITY SYSTEM

(75) Inventors: Masahiro Tanaka, Toyota (JP); Takeo Endo, Nagoya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 215 days.

(21) Appl. No.: 11/401,927

(22) Filed: Apr. 12, 2006

(65) Prior Publication Data

US 2006/0244577 A1 Nov. 2, 2006

(30) Foreign Application Priority Data

| Apr. 13, 2005 | (JP) | ............................. 2005-116000 |
| Jul. 19, 2005 | (JP) | ............................. 2005-208948 |
| Aug. 23, 2005 | (JP) | ............................. 2005-240672 |
| Oct. 31, 2005 | (JP) | ............................. 2005-316922 |

(51) Int. Cl.
*B60R 25/10* (2006.01)
(52) U.S. Cl. ..................... 340/429; 340/440; 340/566; 340/665; 200/52 A
(58) Field of Classification Search ................ 340/429, 340/440, 566, 665; 200/52 A, 61.45 R
See application file for complete search history.

(56) References Cited

U.S. PATENT DOCUMENTS

| 4,741,206 | A | * | 5/1988 | Ishiguro et al. .......... 73/117.01 |
| 5,155,467 | A | * | 10/1992 | Matsubara ................... 340/429 |
| 6,249,215 | B1 | | 6/2001 | Dilz et al. |
| 6,445,085 | B1 | * | 9/2002 | Toda et al. ................. 307/10.8 |
| 2002/0109408 | A1 | | 8/2002 | Ries-Mueller |
| 2004/0212686 | A1 | * | 10/2004 | Usami ................... 348/208.99 |
| 2004/0217849 | A1 | | 11/2004 | Maehara |
| 2006/0244576 | A1 | * | 11/2006 | Sugie et al. ................. 340/429 |

FOREIGN PATENT DOCUMENTS

| DE | 295 05 867 U1 | 5/1996 |
| DE | 101 10 493 A1 | 9/2002 |
| DE | 101 40 068 A1 | 2/2003 |
| EP | 1 205 367 A2 | 5/2002 |
| JP | 63-78848 | 4/1988 |
| JP | 8-207710 | 8/1996 |
| JP | 2000-6761 | 1/2000 |
| JP | 2003-34233 | 2/2003 |
| JP | 2005-225251 | 8/2005 |
| WO | WO 99/44870 | 9/1999 |

* cited by examiner

*Primary Examiner*—Daryl Pope
(74) *Attorney, Agent, or Firm*—Oblon, Spivak, McClelland, Maier & Neustadt, P.C.

(57) ABSTRACT

In a vehicular anti-theft security system which includes a theft detection sensor that detects an abnormality of the vehicle associated with vehicle theft, and performs a theft preventing operation when the theft detection sensor detects the abnormality, an altitude measuring device is provided for measuring the altitude of the vehicle, and a controller restricts the theft preventing operation in the case where the altitude measuring device observes a specified change in the altitude of the vehicle within a specified period of time when the theft detection sensor detects the abnormality.

31 Claims, 13 Drawing Sheets

(1)

(2)

F I G . 14

| 220 VEHICLE-HEIGHT CONDITION | 221 DISPLACEMENT OF SUSPENSION FOR LIFTING OF TIRE UPON JACK-UP | 222 VEHICLE INCLINATION ANGLE FOR LIFTING OF TIRE UPON JACK-UP | 223 INCLINATION ANGLE (THRESHOLD VALUE) AS A BASIS FOR ALARM GENERATION |
|---|---|---|---|
| HI | SMALL | SMALL | $\theta 1$ |
| NORMAL | MEDIUM | MEDIUM | $\theta 2$ |
| LOW | LARGE | LARGE | $\theta 3$ |

VEHICULAR ANTI-THEFT SECURITY SYSTEM

INCORPORATION BY REFERENCE

The disclosures of Japanese Patent Applications Nos. 2005-116000, 2005-208948, 2005-240672, 2005-316922 filed on Apr. 13, 2005, Jul. 19, 2005, Aug. 23, 2005 and Oct. 31, 2005, respectively, each including the specification, drawings and abstract, are incorporated herein by reference in their entireties.

BACKGROUND OF THE INVENTION

1. Field of the Invention

The invention relates to vehicular anti-theft security systems that perform theft preventing operations so as to prevent or deter unauthorized use or theft of vehicles. The invention also relates to vehicular anti-theft security systems that change conditions for generating an alarm based on the expansion or contraction of suspensions and the angle of inclination of the vehicle.

2. Description of Related Art

An anti-theft security system for a vehicle is known which assumes towing or other event(s) associated with vehicle or tire theft when detecting an inclination of the vehicle, and generate an alarm based on the assumption. However, the anti-theft security system of this type may undesirably perform a warning operation upon detection of oscillation or other movement(s) of the vehicle when it is parked in, for example, a multi-level parking garage. In view of this situation, a theft detection system for a vehicle, such as that disclosed in Japanese Laid-open Patent Publication No. 2003-34233, has been proposed which performs a warning operation in a normal parking mode when an inclination sensor detect an inclination of the vehicle, but determines whether or not to perform a warning operation without taking account of the information (i.e., inclination of the vehicle) from the inclination sensor when a multi-level parking mode is set by the user upon parking in a multi-level parking garage. Thus, the inclination sensor is prevented from erroneously detecting inclination of the vehicle due to oscillation or other movement(s) thereof during entry or release of the vehicle into or from the multi-level parking garage.

According to the disclosure or suggestion of the above-identified publication, however, the theft detection system requires the user to manually operate a remote controller so as to switch to or select the multi-level parking mode for ignoring detection of inclination by the inclination sensor. Thus, the user may find it inconvenient to manually select the multi-level parking mode each time the vehicle enters or leaves the multi-level parking garage.

The above-described known anti-theft security system, which generates an alarm based on the information from the inclination sensor and others for prevention of vehicle theft, may also be actuated by mistake due to inclination of the parking place when the vehicle is parked on a slope, or in a ferry traveling on the sea, or in a multi-level parking garage. Also, a conventional anti-theft security system using a vibration sensor may be actuated by mistake due to vibrations caused by, for example, heavy rain, strong wind, or passage of heavy equipment nearby.

In view of the above situations, a vehicular anti-theft security system as disclosed in Japanese Laid-open Patent Publication No. 63-078848 has been proposed which monitors the stroke position of a shock absorber in a suspension system, and actuates a theft prevention mechanism when a substantially full stroke of the shock absorber is detected, to thereby prevent or deter theft of the vehicle while preventing erroneous actuation of the mechanism due to the inclination or vibrations as described above.

However, the anti-theft security system as disclosed in JP-A-63-078848 has the following problem: since the theft prevention mechanism is not actuated until the vehicle is lifted up and the shock absorber is placed in a substantially full-stroke condition, the security system cannot be applied to vehicles that may be jacked up and towed without having the shock absorber placed in a substantially full-stroke condition, for example, to a vehicle equipped with a vehicle-height adjustment type suspension system capable of adjusting the height of the vehicle.

SUMMARY OF THE INVENTION

It is therefore an object of the invention to provide a vehicular anti-theft security system that is deterred or prevented from erroneous actuation or operations while assuring improved convenience of the user. It is another object to provide a vehicular anti-theft security system capable of detecting theft-related acts or events with improved reliability, without erroneously actuating its theft prevention mechanism.

To accomplish the above objects, there is provided according to a first aspect of the invention a vehicular anti-theft security system which includes a theft detector that detects an abnormality of a vehicle associated with vehicle theft, and performs a theft preventing operation when the theft detector detects the abnormality, which system comprises: an altitude measuring device that measures the altitude of the vehicle, and a controller that restricts the theft preventing operation in the case where the altitude measuring device observes a specified change in the altitude of the vehicle within a specified period of time when the theft detector detects the abnormality. With this arrangement, if a specified change in the altitude of the vehicle is observed, the anti-theft security system does not perform a theft preventing operation even if the theft detector detects an abnormality of the vehicle. This arrangement eliminates the need for the user to manually switch to or select a mode for restricting or inhibiting the theft preventing operation, thus assuring improved convenience of the user.

Preferably, the theft detector comprises an inclination detector that detects an inclination of the vehicle. Since the theft preventing operation is restricted based on the change in the altitude of the vehicle, the inclination detector is prevented from erroneously detecting inclination of the vehicle that occurs, for example, during transfer of the vehicle on a pallet or parking platform in a multi-level parking garage or tower or during loading of the vehicle onto a ferry, or the like, by means of a crane.

It is also preferable that the theft detector comprises a moving-body detector that detects an object that moves in a vehicle compartment. Since the theft preventing operation is restricted based on the change in the altitude of the vehicle, the moving-body detector is prevented from erroneously detecting movement (e.g., oscillation) of an object, such as a mascot, in the vehicle compartment, which occurs during, for example, transfer of the vehicle on a pallet or parking platform in a multi-level parking garage or tower.

According to a second aspect of the invention, there is provided a vehicular anti-theft security system which includes a sensor that detects movement of a vehicle, and performs a theft preventing operation when the sensor detects the movement of the vehicle during parking of the vehicle, which system comprises: a rotation detector that detects rotation of the vehicle in a yawing direction, and a controller that restricts the theft preventing operation in the case where the rotation detector detects a rotational state of the vehicle when the sensor detects the movement of the vehicle during parking of the vehicle.

The above-described arrangement makes it possible to restrict or inhibit a theft preventing operation depending upon the rotational state of the vehicle in the yawing direction. Thus, the sensor is prevented from sensing, by mistake, movement (e.g., oscillation) of the vehicle that occurs due to the rotary motion of a turn table or pallet installed in a multi-level parking garage, or the like, and the anti-theft security system is thus prevented from performing erroneous theft preventing operations, such as actuation of an alarm device. Upon detection of the rotational state of the vehicle due to the rotary motion as described above, the anti-theft security system does not perform any theft preventing operation even if the sensor detects movement, such as oscillation, of the vehicle. This arrangement eliminates the need for the user to perform a manual operation to switch to or select a mode for restricting or inhibiting theft preventing operations, thus assuring improved convenience of the user.

In the case where the oscillation or other movement of the vehicle is detected through detection of inclination of the vehicle, the sensor may be an inclination detector that detects an inclination of the vehicle.

According to a third aspect of the invention, there is provided a vehicular anti-theft security system, which comprises: (a) a detector that detects movement of a vehicle, (b) a warning device that performs a warning operation associated with a state of the vehicle, and (c) a controller that determines whether an alert condition is established in which the vehicle is on the alert for theft, causes the warning device to perform the warning operation based on the movement of the vehicle while the vehicle is in the alert condition, and inhibits the warning device from performing the warning operation based on the movement of the vehicle detected by the detector when the movement of the vehicle becomes equal to or larger than a predetermined value during a period between a first point of time at which the controller determines establishment of the alert condition and a second point of time at which a first predetermined time elapses from the first point of time. The anti-theft security system according to this aspect of the invention can prevent the warning device from performing a warning operation upon detection of movement, such as oscillation, of the vehicle caused by, for example, transfer of the vehicle when it is parked in a multi-level parking garage or a ferry, without requiring any manual operation of the user of the vehicle. Thus, the anti-theft security system of the invention restricts or inhibits erroneous actuation or operation of its theft prevention system, while assuring improved convenience of the user.

According to a fourth aspect of the invention, there is provided a vehicular anti-theft security system, which comprises: (a) a detector that detects movement of a vehicle, (b) a warning device that performs a warning operation associated with a state of the vehicle, and (c) a controller that determines whether an alert condition is established in which the vehicle is on the alert for theft, causes the warning device to perform the warning operation based on the movement of the vehicle while the vehicle is in the alert condition, and inhibits the warning device from performing the warning operation based on the movement of the vehicle detected by the detector when the movement of the vehicle becomes equal to or larger than a predetermined value that is larger than the movement of the vehicle based on which the warning operation is performed. The anti-theft security system according to this aspect of the invention can prevent the warning device from performing a warning operation, without requiring a manual operation of the user, upon detection of movement (e.g., oscillation) of the vehicle that occurs during, for example, transport on a ferry, which movement is larger than that of the vehicle occurring due to an event associated with theft. Thus, the anti-theft security system of the invention restricts or inhibits erroneous actuation or operation of its theft prevention system, while assuring improved convenience of the user.

In the vehicular anti-theft security system according to the third or fourth aspect of the invention, the detector may detect inclination of the vehicle as the movement of the vehicle, or may detect an acceleration of the vehicle as the movement of the vehicle.

In the vehicular anti-theft security system according to the fourth aspect of the invention, where the detector detects inclination of the vehicle as the movement of the vehicle, the controller may stop the warning operation based on the inclination of the vehicle detected by the detector when the inclination of the vehicle becomes equal to or larger than the predetermined value by the time when a second predetermined time elapses since the inclination of the vehicle detected by the detector reaches the inclination of the vehicle based on which the warning operation is performed. In some cases, it may be detected that the inclination of the vehicle reaches a reference level at which the warning operation is to be performed before it is detected that the inclination of the vehicle reaches a reference level at which the warning operation is to be restricted. In such cases, it is preferable to stop or cancel the warning operation that has been initiated or is ready to be initiated.

According to a fifth aspect of the invention, there is provided a vehicular anti-theft security system, which comprises: (a) an acceleration sensor that detects an acceleration of a vehicle, (b) an inclination sensor that detects an inclination of the vehicle, (c) a warning device that performs a warning operation associated with a state of the vehicle, and (d) a controller that determines whether an alert condition is established in which the vehicle is on the alert for theft, causes the warning device to perform the warning operation based on the inclination of the vehicle while the vehicle is in the alert condition, and inhibits the warning device from performing the warning operation based on the inclination of the vehicle when the acceleration of the vehicle detected by the acceleration sensor becomes equal to or larger than a predetermined value during a period between a first point of time at which the controller determines establishment of the alert condition and a second point of time at which a first predetermined time elapses from the first point of time. According to a sixth aspect of the invention, there is provided a vehicular anti-theft security system, which comprises: (a) an acceleration sensor that detects an acceleration of a vehicle, (b) an inclination sensor that detects an inclination of the vehicle, (c) a warning device that performs a warning operation associated with a state of the vehicle, and (d) a controller that determines whether an alert condition is established in which the vehicle is on the alert for theft, causes the warning device to perform the warning operation based on the inclination of the vehicle while the vehicle is in the alert condition, and inhibits the warning device from performing the warning operation based on the inclination of the vehicle when the acceleration of the vehicle detected by the acceleration sensor becomes equal to or larger than a predetermined value.

In the vehicular anti-theft security system according to any of the third through sixth aspects of the invention, the controller may determine that the alert condition is established when no passenger exists in a vehicle compartment. Thus, the anti-theft security system can avoid a warning operation which would be otherwise performed due to movement of the vehicle that occurs, for example, when the passenger gets off the vehicle.

According to a seventh aspect of the invention, there is provided a vehicular anti-theft security system, which comprises: (a) a vehicle-height condition detector that detects a vehicle-height condition, (b) a vehicle inclination angle detector that detects an angle of inclination of the vehicle, and (c) an alarm generating device that generates an alarm when the vehicle-height condition detector detects one selected from two or more prescribed vehicle-height conditions, and the vehicle inclination angle detector detects a specified angle of inclination of the vehicle.

The anti-theft security system according to the above aspect of the invention can prevent its theft prevention system from being actuated by mistake, and detect an event or act associated with theft with improved reliability.

In the anti-theft security system according to the seventh aspect of the invention, the vehicle-height condition detector may detect one of the prescribed vehicle-height conditions based on expansion or contraction of a suspension for each wheel.

In the anti-theft security system according to the seventh aspect of the invention, the specified angle of inclination of the vehicle may be set based on the detected one of the prescribed vehicle-height conditions which is detected by the vehicle-height condition detector.

According to an eighth aspect of the invention, there is provided a vehicular anti-theft security system, which comprises: (a) a vehicle posture detector that detects an angle of inclination of the vehicle and a vehicle-height condition based on expansion or contraction of a suspension for each wheel, and (b) an alarm generating device that generates an alarm when the vehicle posture detector detects one selected from two or more prescribed vehicle-height conditions and a specified angle of inclination of the vehicle.

The anti-theft security system according to the above aspect of the invention can prevent its theft prevention system from being actuated by mistake, and detect an event or act associated with theft with improved reliability.

BRIEF DESCRIPTION OF THE DRAWINGS

The foregoing and/or further objects, features and advantages of the invention will become more apparent from the following description of exemplary embodiments with reference to the accompanying drawings, in which like numerals are used to represent like elements and wherein:

FIG. 14 is a table that indicates the relationship between the vehicle-height condition, and the displacement of a suspension and the angle of inclination of the vehicle required for lifting a tire off the ground upon jack-up.

DETAILED DESCRIPTION OF EXEMPLARY EMBODIMENTS

Figure 1:
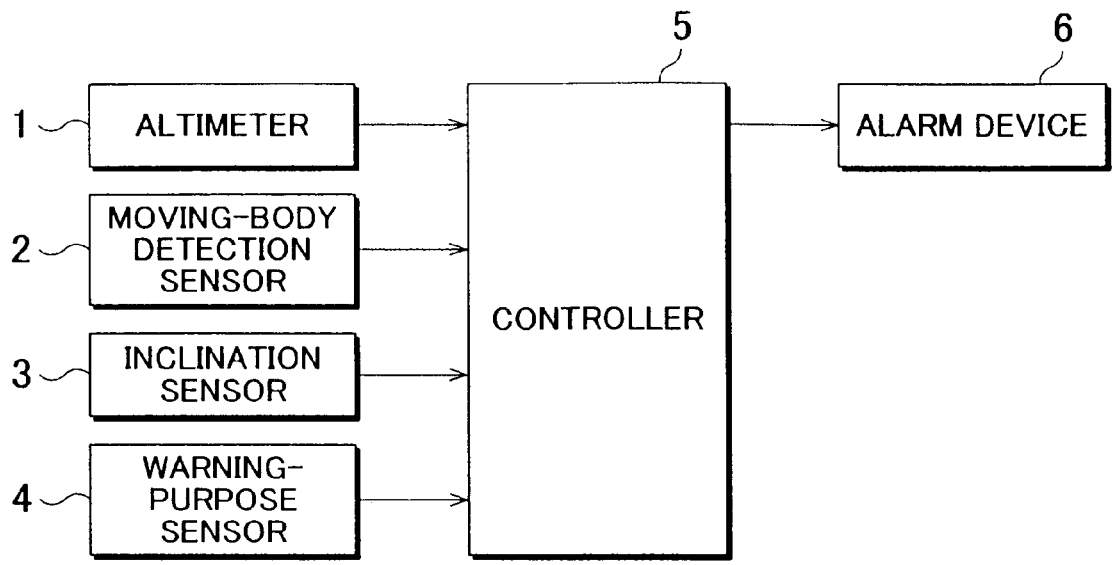
FIG. 1 is a block diagram of a vehicular anti-theft security system according to a first embodiment of the invention.

Some exemplary embodiments of the invention will be described in detail with reference to the accompanying drawings. FIG. 1 is a block diagram of an anti-theft security system for a motor vehicle constructed in accordance with a first embodiment of the invention.

The anti-theft security system of FIG. 1 includes an altimeter 1 serving as an altitude measuring means for measuring the altitude of the vehicle. For example, the altimeter 1 may be in the form of a barometric altimeter that measures the altitude by using changes in the atmospheric pressure, or a radio altimeter that measures the altitude by using the time it takes for radio waves emitted toward the ground to be reflected and returned. The altimeter 1 may also measure the altitude of the vehicle by using GPS (Global Positioning System). In a measurement method or technique using GPS, GPS receivers installed at an observation point (stationary point) as a datum point and at an observation point (moving point) as a point to be measured are arranged to simultaneously receive signals from GPS satellites, and the signal acquired at the stationary point is transmitted to the moving point by means of a radio equipment, or the like, so that the base line analysis is immediately performed at the moving point so as to determine the position of the moving point. In this embodiment, a certain base station on the ground may be regarded as the stationary point, and the vehicle may be regarded as the moving point.

The anti-theft security system also includes theft detection sensors as theft detecting means for detecting abnormalities that occur to the vehicle in association with vehicle theft. The theft detection sensors include a moving-body detection sensor 2, inclination sensor 3 and a warning-purpose sensor or sensors 4.

The moving-body detection sensor 2 serves as a moving-body detecting means for detecting an object that moves in the vehicle compartment. The moving-body detection sensor 2 may detect a moving body, for example, by using ultrasonic waves, or the like, or using a camera or a load sensor mounted under the seat. The use of the moving-body detection sensor 2 as described above makes it basically possible to detect suspicious movements of, for example, a person (i.e., intruder) in the vehicle department who enters the vehicle by breaking a window without opening a door.

The inclination sensor 3 serves as an inclination detecting means for detecting inclination of the vehicle. For example, the inclination sensor 3 detects inclination of the vehicle by using liquid-level displacement of a sealed-in fluid, or the like. The inclination sensor 3 may also detect the inclination of the vehicle by utilizing a G sensor capable of detecting fluctuations or relatively small changes (e.g., ±1 G) in G (acceleration), or a gyro meter. The use of the inclination sensor 3 as described above makes it basically possible to detect unusual or unnatural inclination of the vehicle caused by, for example, jack-up or towing associated with vehicle theft or tire theft.

The warning-purpose sensor 4 generally refers to one or more theft detection sensors in general use, other than the moving-body detection sensor 2 and the inclination sensor 3, or one or more sensors that may be used as theft detection sensor(s). For example, the warning-purpose sensor 4 consists of one or more selected from courtesy switches that detect the open/closed states of passenger doors (for getting-in and getting-out), engine cover or hood and a luggage door, a battery removal detection sensor capable of detecting removal of the battery, a door lock detection switch, a key switch, and ECU (door ECU, engine ECU, etc.) that monitors these sensors and switches.

The anti-theft security system of FIG. 1 further includes a controller 5 that controls theft preventing operations or anti-theft measures, such as actuation of an alarm device or inhibition of engine start-up, according to certain alarm initiating conditions, on the basis of measurement/detection information received from the altimeter 1, moving-body detection sensor 2, inclination sensor 3 and the warning-purpose sensor 4. The controller 5 includes CPU, RAM, ROM that stores programs, and other components. The alarm initiating conditions may be met, for example, when any door is unlocked by any means other than keys or transmitters, or when someone removes the battery without taking prescribed steps, or when a moving body is detected within the vehicle compartment while all of the doors are fully closed and locked, or when the vehicle is inclined by an angle equal to or larger than a predetermined value while all of the doors are fully closed and locked.

The anti-theft security system of FIG. 1 further includes an alarm device 6 in the form of, for example, a signal lamp, a horn, an engine-hood lock switch, or the like. The alarm device 6 performs a warning operation (for example, switching-on of a hazard warning lamp, blowing of a horn, forced locking) in response to a command from the controller 5, to thereby deter or prevent unauthorized use or acts of theft, such as release of a lock as a wrongdoing, intrusion into the vehicle compartment and towing.

Figure 2:
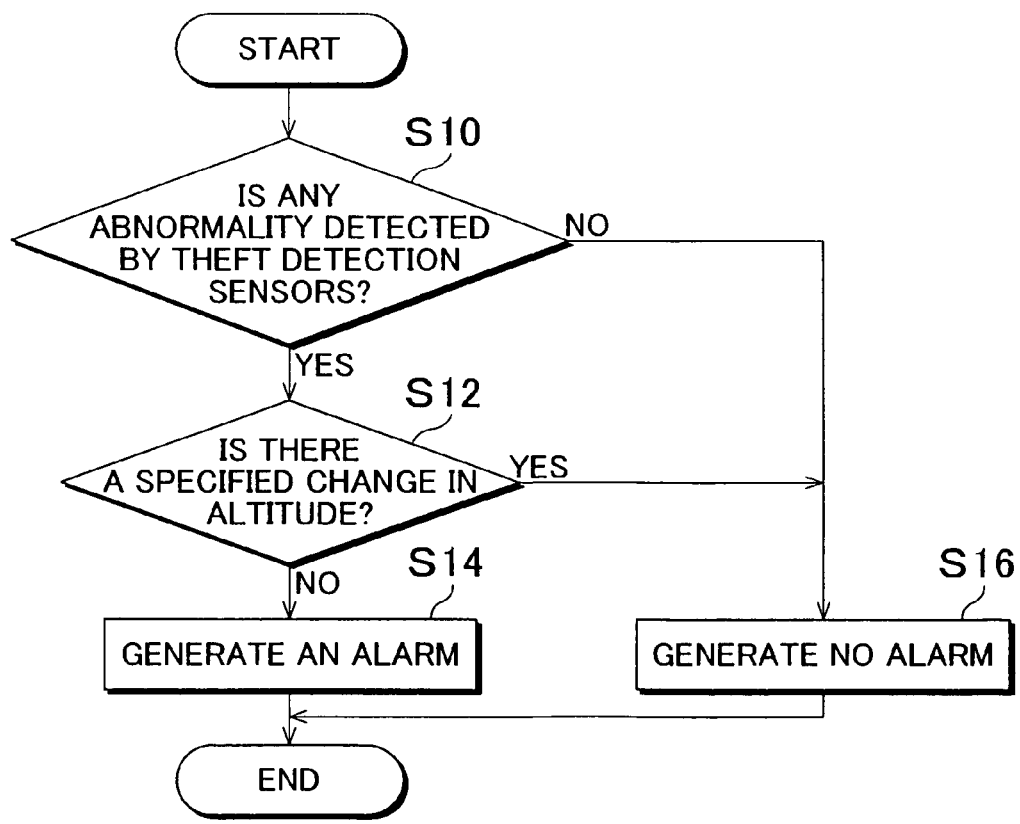
FIG. 2 is a flowchart illustrating a first example of control process performed by a controller of the anti-theft security system of FIG. 1.
Figure 3:
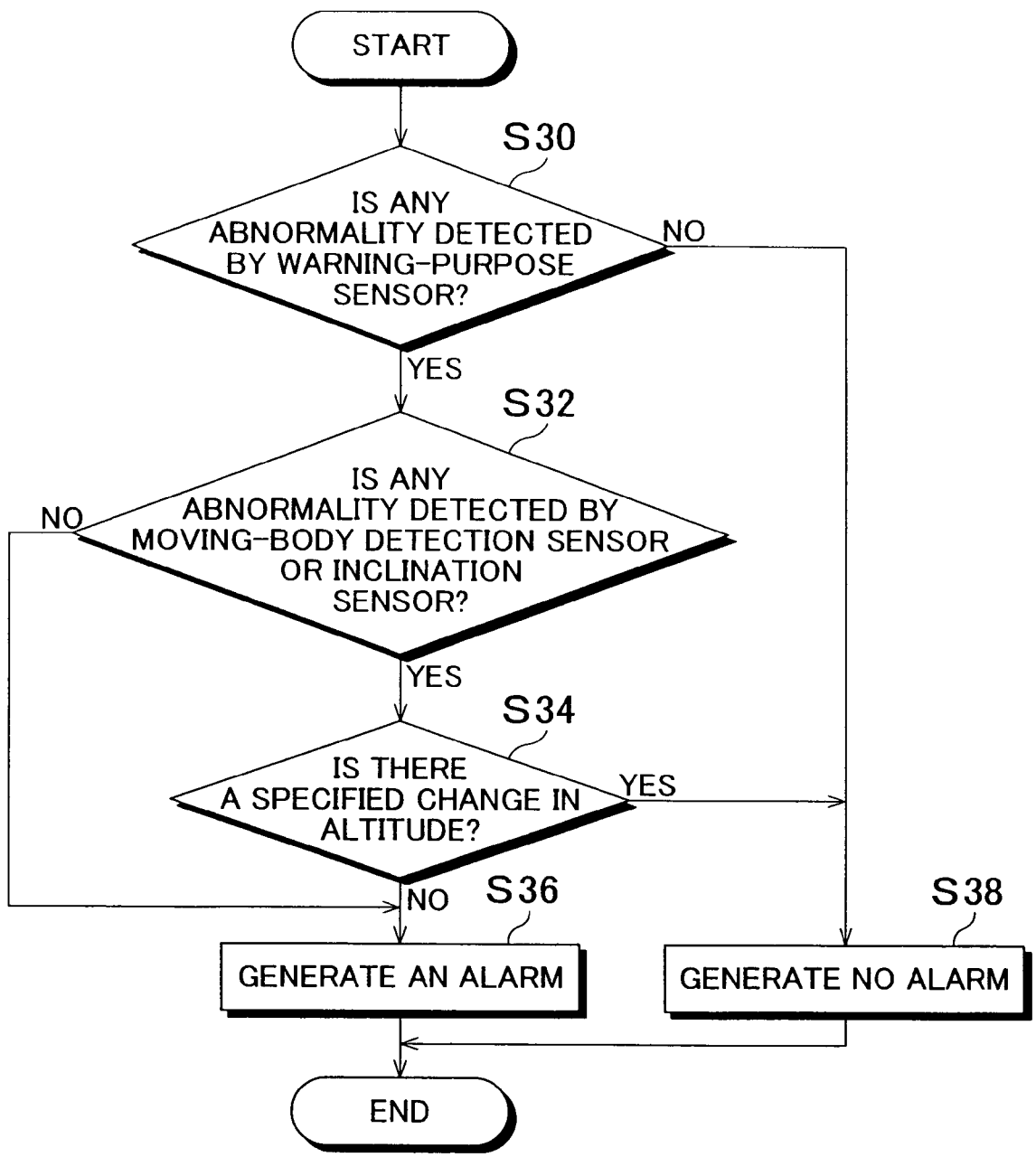
FIG. 3 is a flowchart illustrating a second example of control process performed by the controller of the anti-theft security system of FIG. 1.
Figure 4:
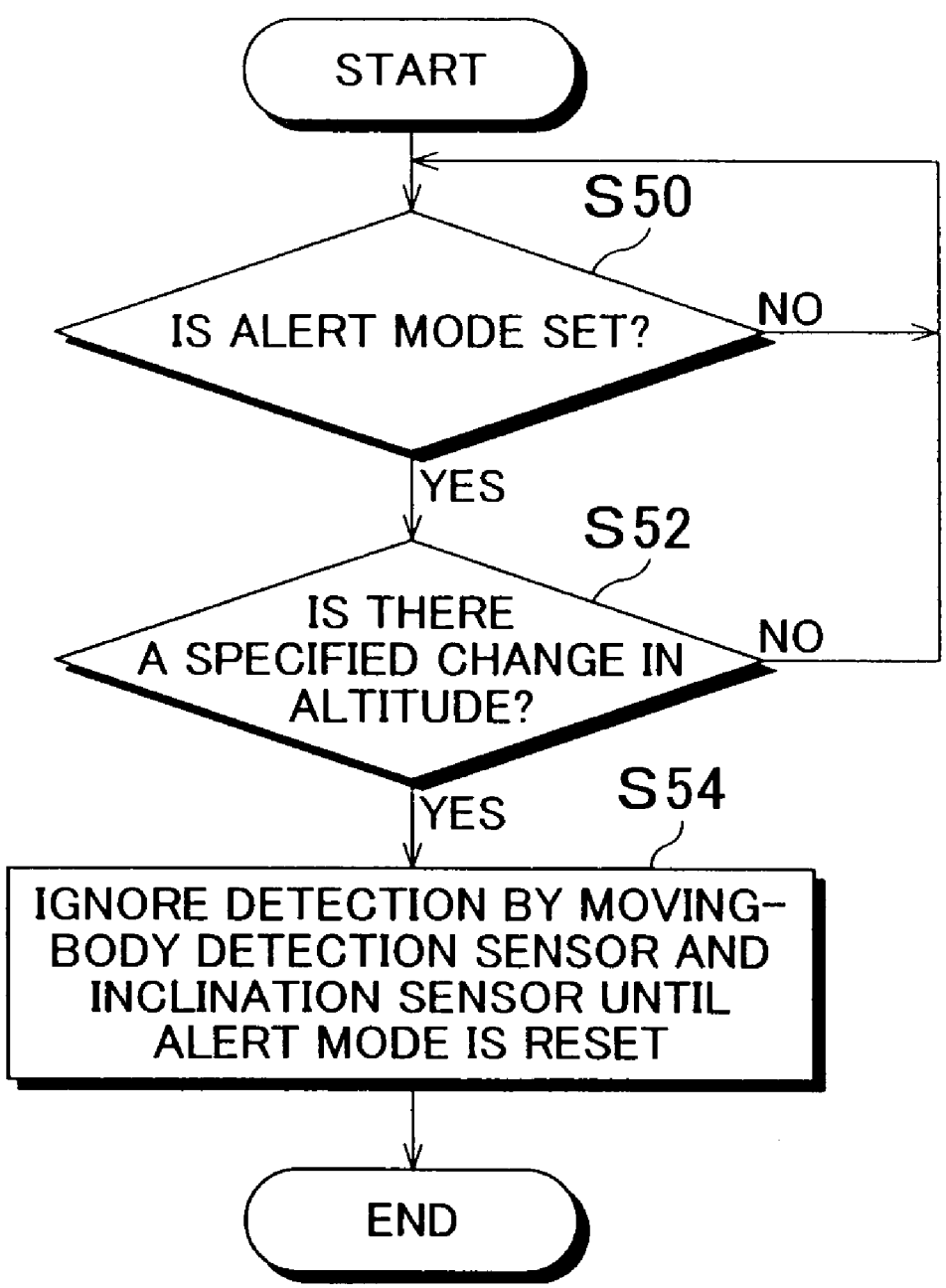
FIG. 4 is a flowchart illustrating a third example of control process performed by the controller of the anti-theft security system of FIG. 1.

Referring next to FIG. 2 through FIG. 4, some examples of the operation of the vehicular anti-theft security system according to the first embodiment of the invention will be described in detail.

FIG. 2 is a flowchart illustrating a first example of control process performed by the controller 5 of the vehicular anti-theft security system of FIG. 1. The controller 5 determines whether any abnormality occurs in the vehicle, based on detection information from the theft detection sensors (i.e., the moving-body detection sensor 2, inclination sensor 3 and the warning-purpose sensor 4), under a condition where the user is away from the vehicle and the alert mode is set (i.e., the vehicle is on the alert for theft) (step S10). If there is no abnormal detection information, the controller 5 determines that there is no possibility of vehicle theft, and does not generate a command for a warning operation to the alarm device 6 (step S16). If any abnormality exists in the detection information from at least one of the above-indicated theft detection sensors, on the other hand, the controller 5 determines that there is a possibility of vehicle theft. When determining that there is a possibility of vehicle theft, the controller 5 acquires information on the altitude of the vehicle measured by the altimeter 1, and determines whether a specified change (e.g., several m/sec.) in the altitude is observed (e.g. whether a change in the altitude is equal to or larger than a predetermined value) within a specified period of time (step S12). If such a change in the altitude is observed, the controller 5 determines that the vehicle is in an exceptional parking or loading mode, for example, the vehicle is transferred on a pallet or parking platform in a multi-level parking garage or tower, or the vehicle is loaded onto a ferry by means of a crane. In this case, the controller 5 does not generate a command for a warning operation to the alarm device 6 (step S16). If the specified change in the altitude is not observed, on the other hand, the controller 5 generates a command for a warning operation to the alarm device 6, based on detection of the abnormality by the theft detection sensors (step S14).

According to the control process of FIG. 2 as described above, if the specified change in the altitude of the vehicle is observed by the altimeter 1, no warning operation is performed even if an abnormality is detected by the theft detection sensors. Thus, the anti-theft security system of this embodiment does not require the user to manually switch to or select an operating mode for preventing erroneous theft detection by the theft detection sensors, thus assuring improved convenience of the user.

FIG. 3 is a flowchart illustrating a second example of control process performed by the controller 5 of the vehicular anti-theft security system of FIG. 1. The controller 5 determines whether any abnormality occurs in the vehicle, based on detection information from the warning-purpose sensor 4, under a condition where the user is away from the vehicle and the alert mode is set (step S30). If there is no abnormal detection information, the controller 5 determines that there is no possibility of vehicle theft, and does not generate a command for a warning operation to the alarm device 6 (step S38). If any abnormality exists in the detection information from the warning-purpose sensor 4, on the other hand, the controller 5 determines whether there is any abnormal detection information from the moving-body detection sensor 2 or the inclination sensor 3 (step S32). If both of the moving-body detection sensor 2 and the inclination sensor 3 detect no abnormality, the controller 5 generates a command for a warning operation to the alarm device 6 based on detection of the abnormality by the warning-purpose sensor 4 (step S36). If any abnormality exists in the detection information from the moving-body detection sensor 2 or the inclination sensor 3, on the other hand, the controller 5 acquires the information on the vehicle altitude measured by the altimeter 1, and determines whether a specified change (e.g., several m/sec.) in the altitude is observed within a specified period of time (step S34). If such a change in the altitude is observed, the controller 5 determines that the vehicle is in an exceptional parking or loading mode, for example, the vehicle is transferred on a pallet or parking platform in a multi-level parking garage or tower, or the vehicle is loaded onto a ferry by means of a crane. In this case, the controller 5 does not generate a command for a warning operation to the alarm device 6 (step S38). If the specified change in the altitude is not observed, on the other hand, the controller 5 generates a command for a warning operation to the alarm device 6, based on detection of the abnormality by the warning-purpose sensor 4 (step S36).

According to the control process of FIG. 3, the alarm device 6 performs a warning operation (i.e., generates an alarm) as a general rule if an abnormality is detected by the warning-purpose sensor 4 (for example, opening of a door is detected by a courtesy switch). If the specified change in the altitude of the vehicle is observed by the altimeter 1, however, the warning operation is not performed even if an abnormality is detected by the moving-body detection sensor 2 or the inclination sensor 3. If an abnormality is detected by the moving-body detection sensor 2 or the inclination sensor 3, the warning operation is performed provided that the specified change in the altitude of the vehicle is not observed. In this manner, the moving-body detection sensor 2 and the inclination sensor 3 are prevented from detecting, by mistake, movement of an object, such as a mascot, in the vehicle compartment or inclination of the vehicle, which occurs during transfer of the vehicle on a pallet or parking platform in a multi-level parking garage, or the like, or during loading of the vehicle onto a ferry, or the like, by means of a crane. Thus, the anti-theft security system of this embodiment is able to distinguish detection of movement of an object (e.g., a mascot) within the compartment or inclination of the vehicle during transfer of the vehicle on the pallet in the multi-level parking garage or loading of the vehicle onto the ferry by the crane, from detection of a moving body or vehicle inclination associated with vehicle theft, such as that caused by towing, which does not involve a substantial change in the altitude of the vehicle. Thus, the security system of this embodiment performs warning operations with improved reliability.

FIG. 4 is a flowchart illustrating a third example of control process performed by the controller 5 of the vehicular anti-theft security system of FIG. 1. The controller 5 determines, based on its own alert-mode flag, or the like, whether the alert mode is set or is not set (i.e., the vehicle is not on the alert for vehicle theft) (step S50). The alert-mode flag is an internal flag of the controller 5, which becomes effective when the alert mode is set. If the alert mode is set, the controller 5 acquires information on the altitude of the vehicle measured by the altimeter 1, and determines whether a specified change in the altitude (e.g., several m/sec.) is observed within a specified period of time (step S52). If such a change in the altitude is observed, the controller 5 ignores detection by the moving-body detection sensor 2 and the inclination sensor 3 until the alert mode is reset (step S54). If the specified change in the altitude is not observed, the controller 5 returns to the beginning of the control flow.

According to the control process of FIG. 4, the controller 5 ignores detection by the moving-body detection sensor 2 and the inclination sensor 3 in the alert mode if the specified change in the altitude of the vehicle is observed by the altimeter 1 while the alert mode is set, and controls theft preventing operations or anti-theft measures solely on the basis of information on an abnormality of the vehicle detected by the warning-purpose sensor 4. In this manner, the moving-body detection sensor 2 and the inclination sensor 3 are prevented from detecting, by mistake, movement of an object, such as a mascot, in the vehicle compartment or inclination of the vehicle, which occurs during transfer of the vehicle on a pallet or parking platform in a multi-level parking garage, or the like, or during loading of the vehicle onto a ferry, or the like, by means of a crane. Thus, the anti-theft security system of this embodiment is able to distinguish detection of movement of an object (e.g., a mascot) within the compartment or inclination of the vehicle during transfer of the vehicle on the pallet in the multi-level parking garage, from detection of a moving body or vehicle inclination associated with vehicle theft, such as that caused by towing, which does not involve a substantial change in the altitude of the vehicle. Thus, the security system of this embodiment performs suitable theft preventing operations or anti-theft measures with improved reliability.

It is to be understood that the invention is not limited to the details of the illustrated embodiment, but may be embodied with various changes, modifications or improvements, which may occur to those skilled in the art without departing from the spirit and scope of the invention.

For example, the alarm device 6 of the illustrated embodiment may be equipped with a radio communication means capable of communicating with a certain location at the outside of the vehicle. On the basis of a command from the controller 5, the alarm device 6 informs the police, emergency center, security service agent, or the like, via radio communication, of occurrence of a wrongdoing, such as a theft, in the vehicle. The content of the information designated by the controller 5 is automatically transmitted to the police or other desired facilities. For example, automatic dialing for an emergency call is effected, and information that can specify the position of the vehicle, for example, the address or the latitude and longitude acquired by a navigation system, or the like, is transmitted in the form of automatic voice to the desired facilities.

Figure 5:
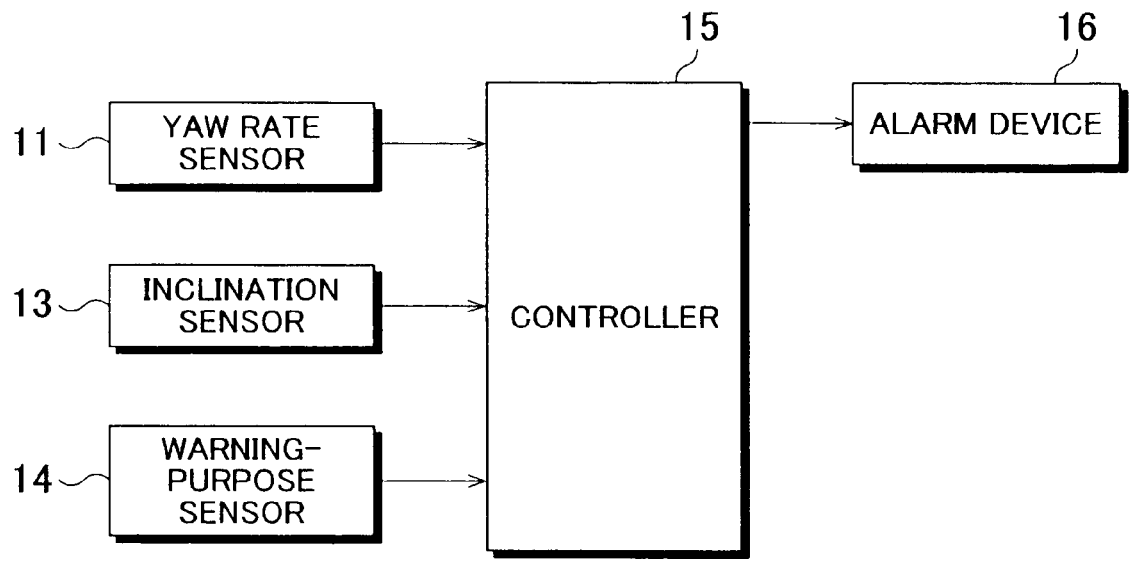
FIG. 5 is a block diagram of a vehicular anti-theft security system according to a second embodiment of the invention.

FIG. 5 shows a vehicular anti-theft security system constructed according to a second embodiment of the invention.

The anti-theft security system of FIG. 5 includes a yaw rate sensor 11 as a rotation detecting means for detecting rotation of the vehicle in the yawing direction. The yaw rate sensor 11, which is installed on the vehicle, detects the angular velocity of the vehicle about the center of gravity, which velocity appears due to a yawing motion of the vehicle. The yaw rate sensor 11 is able to detect not only the yawing motion of the running vehicle caused by, for example, steering, but also the rotary force or torque applied in the yawing direction to the vehicle that is at rest. The information on the angular velocity detected by the yaw rate sensor 11 is output to the controller 15.

The rotation detecting means for detecting the rotation of the vehicle in the yawing direction may also be provided by a direction sensor or a gyro meter, rather than the yaw rate sensor 11. The direction sensor is adapted to detect the direction angle, or azimuth angle, with respect to the true north as the reference direction. For example, if the true north is defined as 0° to be referred to and the angle taken in the clockwise direction relative to the true north is expressed as a positive (+) angle, the true east is 90° and the true west is 270°. Thus, the direction sensor is able to detect rotation of the vehicle in the yawing direction by detecting that the azimuth or direction of the vehicle that is at rest changes with time. It is to be understood that the reference direction of the azimuth is not limited to the true north, but may be selected from other directions, and the positive direction of rotation may be defined with respect to the selected reference direction.

The gyro meter is adapted to detect the angles, angular velocities, accelerations, and the like, with respect to the three axes of X (roll), Y (pitch) and Z (yaw). By using the detected value for the Z-axis, the gyro meter is able to detect rotation of the vehicle in the yawing direction.

The anti-theft security system of this embodiment further includes an inclination sensor 13 as an inclination detecting means for detecting inclination of the vehicle. For example, the inclination sensor 13 may detect the inclination of the vehicle by utilizing a G sensor capable of detecting fluctuations (relatively small changes) (e.g., ±1 G) in G (acceleration), a gyro meter, or the like. The inclination sensor 3 may also able to detect the inclination of the vehicle by using the liquid-level displacement of a sealed-in fluid, or the like. The use of the inclination sensor 3 as described above makes it basically possible to detect unusual or unnatural movement or inclination of the vehicle caused by, for example, jack-up or towing associated with vehicle theft or tire theft. The inclination sensor 13 may incorporate the yaw rate sensor 11 and a G sensor that detects changes in the inclination of the vehicle.

The anti-theft security system of this embodiment further includes a warning-purpose sensor 14, which generally refers to one or more theft detection sensors for detecting abnormalities that occur to the vehicle upon vehicle theft. Namely, the warning-purpose sensor 14 comprises one or more theft detection sensors other than the inclination sensor 13, or one or more sensors that may be used as a theft detection sensor or sensors. For example, the warning-purpose sensor 14 consists of one or more selected from courtesy switches that detect the open/closed states of passenger doors (for getting-in and getting-out), engine cover or hood and a luggage door, a battery removal detection sensor capable of detecting removal of the battery, a door lock detection switch, a key switch, and ECU (door ECU, engine ECU, etc.) that monitors these sensors and switches.

The anti-theft security system of FIG. 5 further includes a controller 15 that controls theft preventing operations or anti-theft measures, such as actuation of an alarm device or inhibition of engine start-up, according to certain alarm initiating conditions, on the basis of measurement/detection information received from the yaw rate sensor 11, inclination sensor 13 and the warning-purpose sensor 14. The controller 15 includes CPU that executes programs for implementing control of the theft preventing operations, and storage means comprising ROM that stores these programs and RAM that temporarily stores the results of operations performed according to the programs, for example. The alarm initiating conditions may be met, for example, when any door is unlocked by any means other than keys or transmitters, or when someone removes the battery without taking prescribed steps, or when the vehicle is inclined by an angle equal to or larger than a predetermined value while all of the doors are fully closed and locked.

The anti-theft security system of FIG. 5 further includes an alarm device 16 in the form of, for example, a signal lamp, a horn, an engine-hood lock switch, or the like. The alarm device 16 performs a warning operation (for example, display of a warning, switching-on of a hazard warning lamp, blowing of a horn, forced locking) in response to a command from the controller 15, to thereby deter or prevent unauthorized use or acts of theft, such as release of a lock as a wrongdoing, intrusion into the vehicle compartment and towing.

Figure 6:
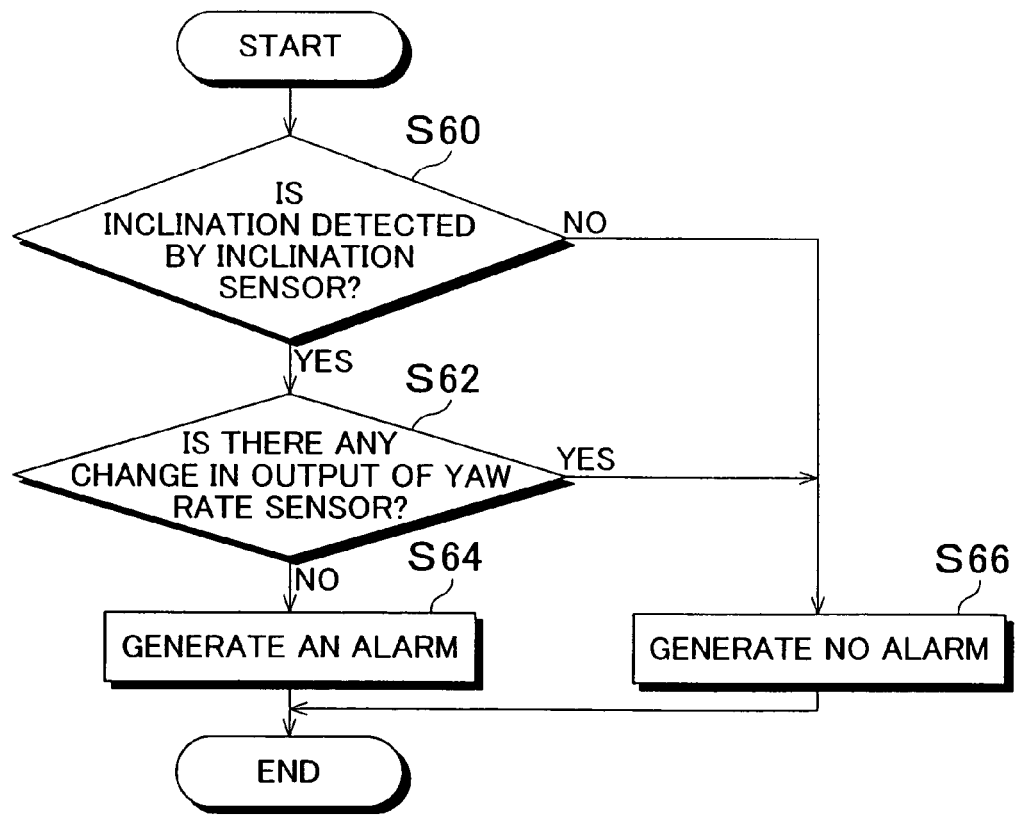
FIG. 6 is a flowchart illustrating a first example of control process performed by a controller of the anti-theft security system of FIG. 5.
Figure 7:
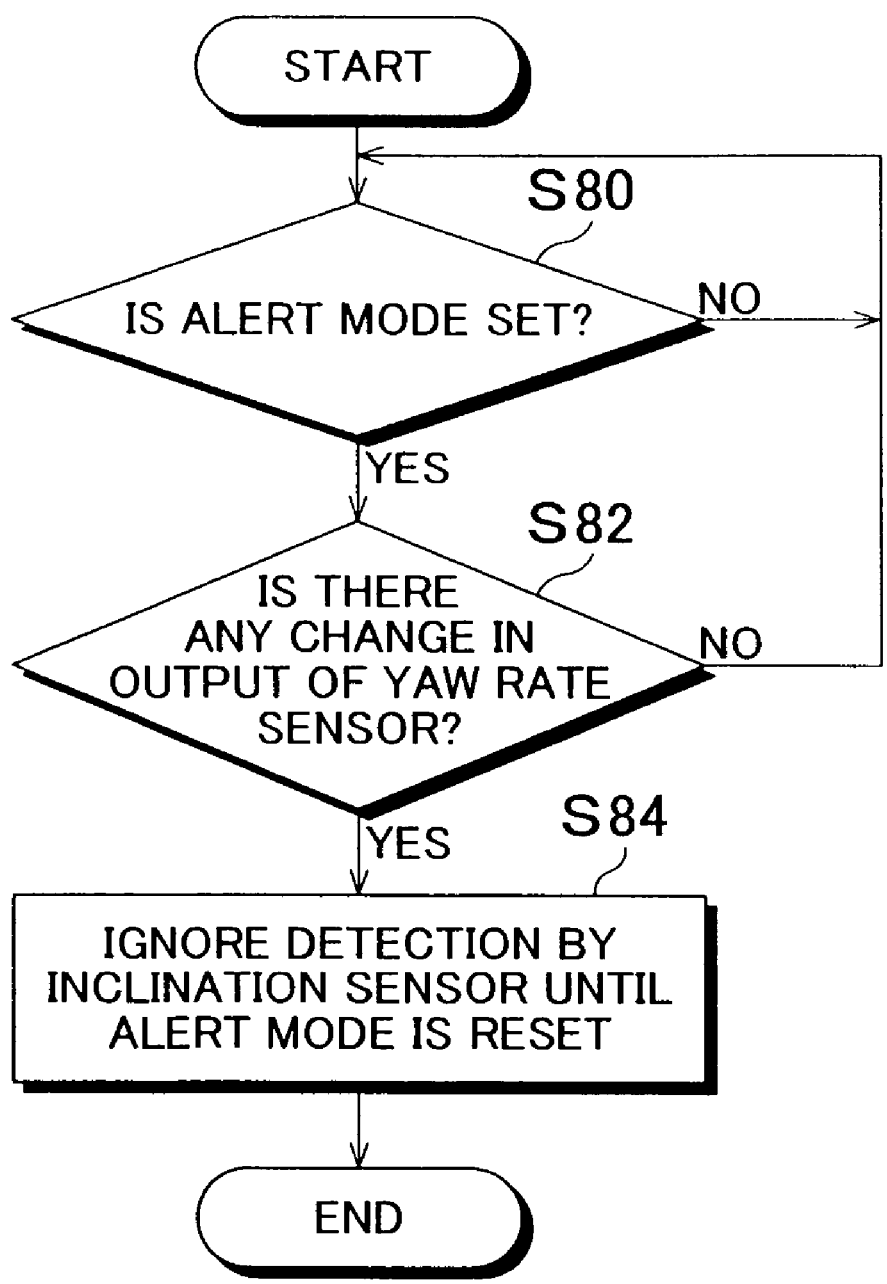
FIG. 7 is a flowchart illustrating a second example of control process performed by the controller of the anti-theft security system of FIG. 5.

Referring next to FIG. 6 and FIG. 7, some examples of the operation of the vehicular anti-theft security system according to the second embodiment of the invention will be described in detail.

FIG. 6 is a flowchart illustrating a first example of control process performed by the controller 15 of the vehicular anti-theft security system of FIG. 5. The controller 15 determines whether the vehicle is inclined based on detection information from the inclination sensor 13, under conditions where the user is away from the vehicle and the alert mode is set (i.e., the vehicle is on the alert for vehicle theft) while the vehicle is being parked (for example, with the engine stopped and the P range selected) (step S60). If no change in the inclination of the vehicle is detected with respect to the angle of inclination of the vehicle detected when the alert mode is set, the controller 15 determines that there is no possibility of vehicle theft, and does not generate a command for a warning operation to the alarm device 16 (step S66).

If a certain change in the inclination of the vehicle is detected with respect to the angle of inclination of the vehicle detected when the alert mode is set, on the other hand, the controller 15 determines that there is a possibility of vehicle theft. The controller 15 that has found a possibility of vehicle theft then acquires an output value of the yaw rate sensor 11, and determines whether there is a change in the output value of the yaw rate sensor 11 (step S62). If there is any change in the output of the yaw rate sensor 11, the controller 15 determines that the vehicle is in an exceptional parking mode in which the output of the yaw rate sensor 11 changes due to rotary motion of a turn table or pallet installed in, for example, a multi-level parking garage or tower. In this case, the controller 15 does not generate a command for a warning operation to the alarm device 16 (step S66). If there is no output change, on the other hand, the controller 15 generates a command for a warning operation to the alarm device 16, based on the change in the inclination detected by the inclination sensor 13 in step S60 (step S64).

If the warning-purpose sensor 14 detects an abnormality (e.g., a courtesy switch detects opening of a door) while the alert mode is set, the alarm device 16 may perform a warning operation even if there is a change in the output value of the yaw rate sensor 11.

According to the control process of FIG. 6, when the inclination sensor 13 detects inclination of the vehicle while the alert mode is set, a warning operation is performed if there is no change in the output of the yaw rate sensor 11, but no warning operation is performed if there is a change in the output of the yaw rate sensor 11.

In the above manner, the anti-theft security system of this embodiment can prevent the inclination sensor 13 from detecting, by mistake, a rotational or oscillatory movement of the vehicle caused by a rotary motion of a turn table or pallet installed in a multi-level parking garage, or the like, and is thus prevented from erroneously actuate the alarm device 16 to perform a warning operation. Thus, the security system of this embodiment is able to distinguish detection of movements of the vehicle caused by the rotary motion of the turn table or pallet installed on the multi-level parking garage, or the like, from detection of movements of the vehicle caused by, for example, towing associated with vehicle theft, which does not involve rotational movements. Thus, the security system performs warning operations with improved reliability.

In the above-described example, if the yaw rate sensor 11 detects a change or changes in the output of the yaw rate sensor 11, no warning operation is performed even if the inclination sensor 13 detects inclination of the vehicle. This arrangement makes it unnecessary for the user to manually switch to or select an operating mode for preventing erroneous detection by the inclination sensor 13, thus assuring improved convenience of the user.

FIG. 7 is a flowchart illustrating a second example of control process performed by the controller 15 of the vehicular anti-theft security system of FIG. 5. The controller 15 determines, based on its own alert-mode flag, or the like, whether the alert mode is set or is not set (i.e., the vehicle is not on the alert for vehicle theft) (step S80). The alert-mode flag is an internal flag of the controller 15, which becomes effective when the alert mode is set. If the alert mode is set, the controller 15 acquires the output value of the yaw rate sensor 11, and determines whether there is any change in the output value of the yaw rate sensor 11 (step S82). If there is a change or changes in the output value, the controller 15 ignores detection by the inclination sensor 13 until the alert mode is reset, for example, through an operation or manipulation of the user (step S84). If there is no change in the output value of the yaw rate sensor 11, on the other hand, the controller 15 returns to the beginning of the control flow.

According to the control process of FIG. 7, the controller 15 ignores detection by the inclination sensor 13 in the alert mode if there is a change or changes in the output value of the yaw rate sensor 11 while the alert mode is set. In this case, the controller 15 controls theft preventing operations or anti-theft measures solely on the basis of information on an abnormality of the vehicle detected by the warning-purpose sensor 14 (which is not influenced by rotational or oscillatory movement of the vehicle).

In the above manner, the anti-theft security system of this embodiment can prevent the inclination sensor 13 from detecting, by mistake, a rotational or oscillatory movement of the vehicle caused by a rotary motion of a turn table or pallet installed in a multi-level parking garage, or the like, and is thus prevented from erroneously actuate the alarm device 16 to perform a warning operation. Thus, the security system of this embodiment is able to distinguish detection of movements of the vehicle caused by the rotary motion of the turn table or pallet installed on the multi-level parking garage, or the like, from detection of movements of the vehicle caused by, for example, towing associated with vehicle theft, which does not involve rotational movements. Thus, the security system performs warning operations with improved reliability.

It is to be understood that the invention is not limited to the details of the illustrated embodiment, but may be embodied with various changes, modifications or improvements, which may occur to those skilled in the art without departing from the spirit and scope of the invention.

For example, the alarm device 16 of the illustrated embodiment may be equipped with a radio communication means capable of communicating with a certain location at the outside of the vehicle. On the basis of a command from the controller 15, the alarm device 16 informs the police, emergency center, security service agent, or the like, via radio communication, of occurrence of a wrongdoing, such as a theft, in the vehicle. The content of the information designated by the controller 15 is automatically transmitted to the police or other desired facilities. For example, automatic dialing for an emergency call is effected, and information that can specify the position of the vehicle, for example, the address or the latitude and longitude acquired by a navigation system, is transmitted in the form of automatic voice to the desired facilities.

The vehicular anti-theft security system of the illustrated embodiment may further include an intrusion sensor that monitors unauthorized intrusion into the vehicle compartment by detecting an object moving in the compartment, as a theft detection sensor other than the warning-purpose sensors 14 as listed above. The intrusion sensor may detect a moving body by utilizing, for example, ultrasonic waves or a camera or cameras installed in the vehicle compartment. The use of the intrusion sensor makes it possible to detect suspicious movements in the vehicle compartment of, for example, a person who enters the vehicle by breaking a window without opening a door.

In the same manner as described above with respect to the second embodiment, the anti-theft security system can prevent the intrusion sensor from detecting, by mistake, a movement(s) of an object, such as a mascot, in the vehicle compartment, which movement(s) may be caused by a rotary motion of a turn table or pallet installed in a multi-level parking garage, or the like, and is thus prevented from erroneously actuate the alarm device to perform a warning operation. Namely, when the intrusion sensor detects a moving object in the vehicle department while the alert mode is set, the security system performs a warning operation if there is no change in the output of the yaw rate sensor 11, but is inhibited from performing a warning operation if there is a change in the output of the yaw rate sensor 11.

In a modified example of the illustrated embodiment, the controller 15 determines whether movement or oscillation of the vehicle is caused by a rotary motion of a turn table or pallet installed on a multi-level parking garage, or the like, based on the actual output value of the yaw rate sensor 11, rather than the presence or absence of a change in the output value of the yaw rate sensor 11. More specifically, the controller 15 stores in advance the angular velocity (which may be a learned value or a value determined by the specifications of the turn table) to be detected upon rotation of the turn table, for example, and determines whether the current movement of the vehicle is caused by the rotary motion of the turn table, by comparing the stored value with the actual output value of the yaw rate sensor 11.

Figure 8:
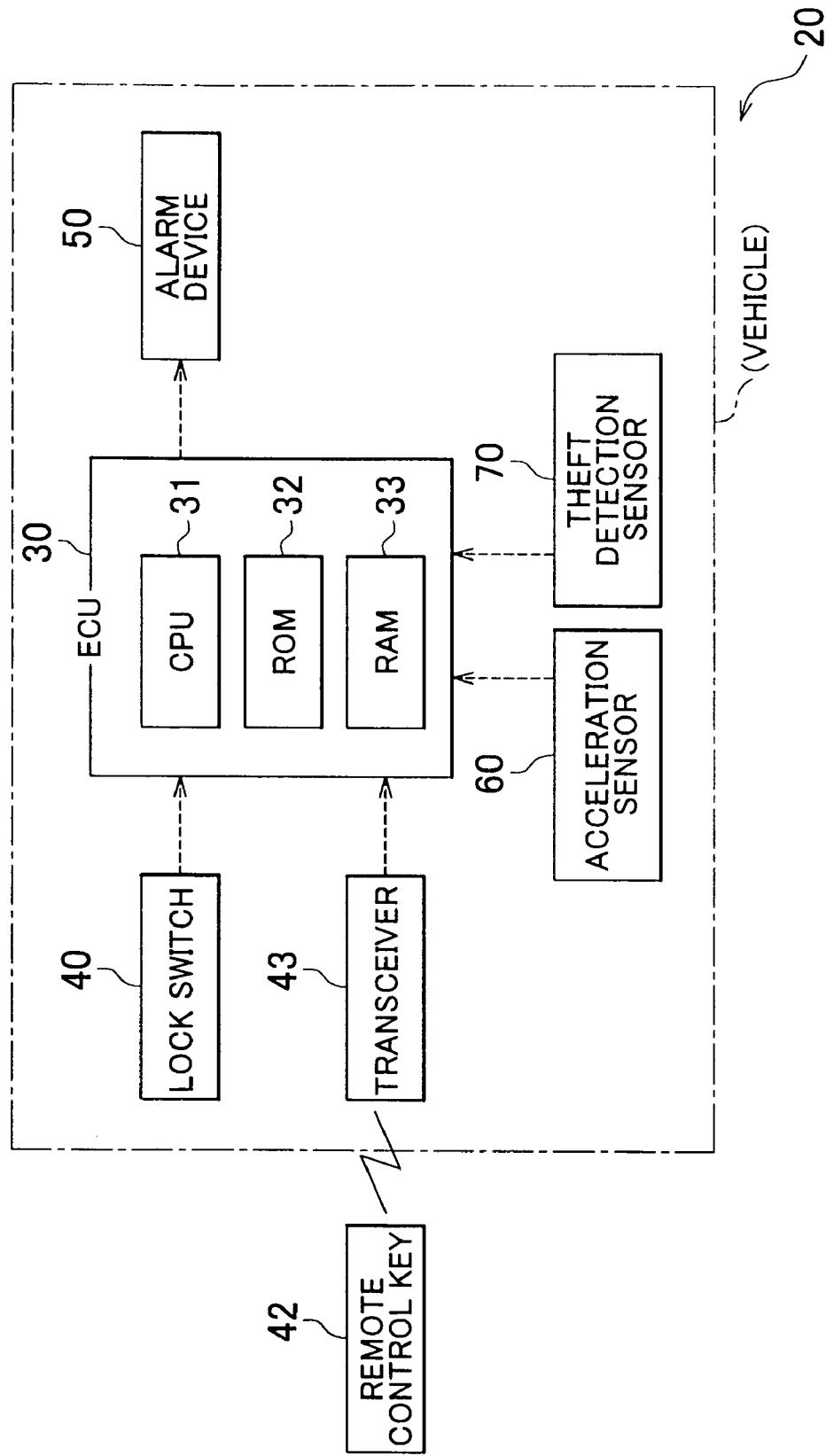
FIG. 8 is a block diagram of a vehicular anti-theft security system according to a third embodiment of the invention.

FIG. 8 shows a vehicular anti-theft security system 20 constructed according to a third embodiment of the invention. The vehicular anti-theft security system 20 includes an electronic control unit (which will be called "ECU") 30 that controls the whole system, a lock switch 40 installed in the vicinity of a door handle of the vehicle, a remote control key 42, a transceiver 43 that communicates with the remote control key 42, an alarm device 50 that performs warning operations in certain cases, an acceleration sensor 60 that detects the acceleration of the vehicle, and a theft detection sensor 70.

The ECU 30 includes CPU 31 that executes programs for, for example, implementing control of theft preventing operations or anti-theft measures, and storage means, such as ROM 32 that stores these programs and RAM 33 that temporarily stores the results of operations of the programs. The ECU 30 receives the acceleration a of the vehicle from the acceleration sensor 60, an abnormal signal from the theft detection sensor 70, and so forth, and calculates a change θ in the inclination of the vehicle from the time at which an alert condition (which will be described later) is initiated, based on the acceleration α. Once the alert condition is initiated upon meeting of certain start conditions, the ECU 30 performs control of warning operations using the alarm device 50 and/or theft preventing operations, such as inhibition of engine start-up, based on the information received from the theft detection sensor 70 and the calculated change θ in the inclination of the vehicle.

The lock switch 40 permits a door or doors to be locked without using a key. If the lock switch 40 is operated, a signal is transmitted to the ECU 30, which in turn issues a command for locking of the door(s).

The remote control key 42 generates very weak radio waves (response signals) in response to request signals transmitted at regular time intervals from the transceiver 43 on the side of the vehicle. When the user carrying the remote control key 42 gets close to the vehicle, the transceiver 43 receives a response signal of the remote control key 42, and the response signal (including an ID code, or the like, specific to the remote control key 42) is decoded and received by the ECU 30. The ECU 30 then performs verification of whether the user carries the authorized remote control key 42, based on the input signal (ID code). If it can be verified that the user carries the authorized remote control key 42, the ECU 30 outputs a command for release of door lock to a body ECU (or a door-lock actuator) when the lock switch 40 is operated.

The alarm device 50 performs a warning operation when receiving a command for the warning operation from the ECU 30. For example, the alarm device 50 may use a communication terminal that receives radio waves from GPS satellites, and sends an alarm signal, along with the information on the position of the vehicle, to other communication facilities or equipment, or may use a horn that is set to sound for a certain period of time, or a signal lamp, or the like.

The acceleration sensor 60, which is installed in the vicinity of the center of gravity of the vehicle, is a two-axis sensor that detects the accelerations in the longitudinal and lateral directions of the vehicle. The acceleration sensor 60 may detect the acceleration α applied to the center of gravity of the vehicle, for example, by detecting strain that occurs in a piezoelectric element and outputting an electric analog signal indicative of the strain. In this connection, an acceleration sensor used for, for example, vehicle behavior control may also be used as the acceleration sensor 60.

The theft detection sensor 70 generally refers to one or more theft detection sensors for detecting abnormalities, other than changes θ in the inclination of the vehicle, which may occur to the vehicle in association with vehicle theft. For example, the theft detection sensor 70 comprises one or more selected from: courtesy switches that detect the open/closed states of passenger doors (for getting-in and getting-out), engine cover or hood and a luggage door, a battery removal detection sensor capable of detecting removal of the battery, a door lock detection switch, and other sensors and switches.

The vehicular anti-theft security system 20 of this embodiment determines that the vehicle is in the alert condition from the time when the door is locked from the outside of the vehicle by means of the lock switch 40 to the time when the door lock is released upon receipt of radio waves from the remote control key 42. If the calculated change θ in the inclination of the vehicle becomes equal to or larger than threshold value A or an abnormal signal is received from the theft detection sensor 7 while the vehicle is in the alert condition, the security system 20 generates a command for a warning operation to the alarm device 50. Here, the threshold value A is approximately set to a value representing a change of the inclination which can occur due to, for example, towing or tire theft, but does not occur while the vehicle is in a normal parking condition. It is, however, to be noted that restrictions are provided on generation of commands for warning operations so that the security system 20 does not perform a warning operation even while the vehicle is in the alert condition if it detects movement or oscillation of the vehicle due to phenomena other than acts of theft. This arrangement will be more specifically described.

Figure 9:
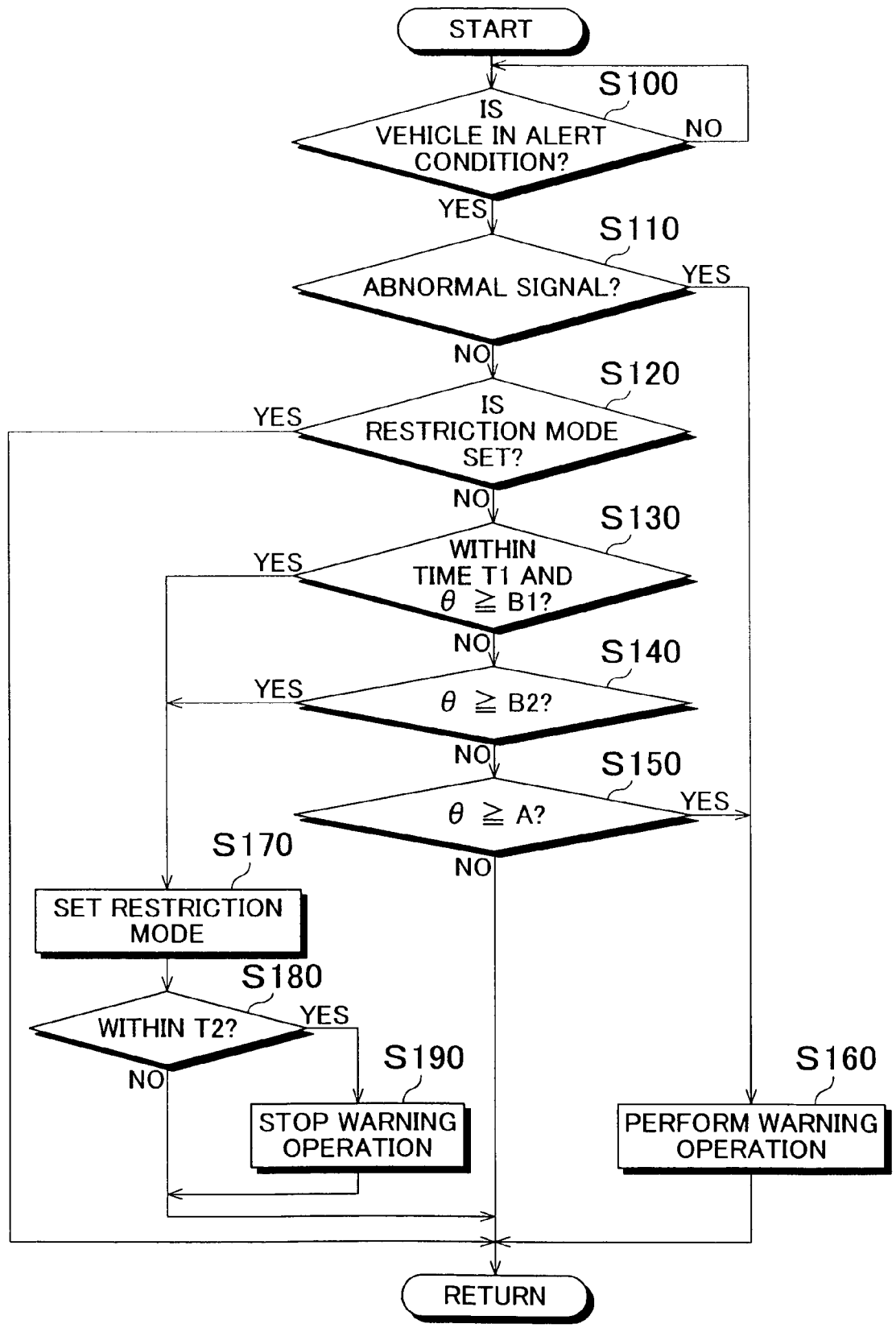
FIG. 9 is a flowchart illustrating one example of control process repeatedly executed by an ECU of the anti-theft security system of FIG. 8.

FIG. 9 is a flowchart illustrating one example of control routine repeatedly executed by the ECU 30. Initially, the ECU 30 determines whether the vehicle is in the alert condition, based on an alert condition flag that is stored in the RAM 33 depending upon the operation of the remote control key 42 (step S100).

If it is determined that the vehicle is in the alert condition (i.e., if an affirmative decision (YES) is made in step S100), it is determined whether the ECU 30 receives an abnormal signal from the theft detection sensor 70 (step S110).

If the ECU 30 receives an abnormal signal from the theft detection sensor 70 (i.e., if an affirmative decision (YES) is made in step S110), the ECU 30 generates a command for a warning operation to the alarm device 50 (step S160), and finishes one cycle of the control routine of FIG. 9. The alarm device 50 that receives the command for the warning operation performs an operation of, for example, transmitting an alarm signal, along with the information on the position of the vehicle, to other communication facilities, or sounding a horn for a certain period of time, as described above.

If the ECU 30 does not receive an abnormal signal from the theft detection sensor 70 (i.e., if a negative decision (NO) is made in step S110), it is determined whether a restriction mode for restricting warning operations based on the acceleration α is set (S120). The determination as to whether the restriction mode is set is made on the basis of a restriction mode flag stored in the RAM 33 according to a process that will be described later. The restriction mode is reset when a negative decision (NO) is made in step S100. If the restriction mode is set (i.e., if an affirmative decision (YES) is made in step S120), the ECU 30 finishes one cycle of the control routine of FIG. 9 without effecting any further processing.

If the restriction mode is not set (i.e., if a negative decision (NO) is made in step S120), it is determined whether the time that has elapsed since the alert condition was established is equal to or shorter than T1 AND the change θ in the inclination of the vehicle is equal to or larger than threshold value B1 (S130). Here, the time T1 is approximately set to a period of time (e.g., 5 to 30 min., preferably, 10 to 20 min.) it takes from the time when the vehicle is parked in a multi-level parking garage to the time when transfer of the vehicle in the parking garage is finished. The threshold value B1 is approximately set to a value representing a change of vehicle inclination that can occur due to, for example, movement of a pallet or rotation of a turn table during entry of the vehicle into a multi-level parking garage. The threshold value B1 may be larger, equal to or smaller than the above-indicated threshold value A.

If the time that has elapsed since the alert condition was established is equal to or shorter than T1 AND the change θ in the inclination of the vehicle is equal to or larger than the threshold value B1 (i.e., if an affirmative decision (YES) is made in step S130), the ECU 30 judges that inclination of the vehicle that can occur during entry of the vehicle into a multi-level parking garage is detected, and sets a particular numerical value to the restriction mode flag so as to store in RAM 33 setting of the restriction mode (step S170).

After execution of step S170, it is determined whether time T2 has elapsed since the change θ in the inclination of the vehicle became equal to or larger than the threshold value A last time (step S180). If a negative decision (NO) is made in step S180, a command for stopping a warning operation is issued to the alarm device 50 (step S190), and one cycle of the control routine of FIG. 9 is finished.

If a negative decision (NO) is made in step S130, on the other hand, it is determined whether the change θ in the inclination of the vehicle is equal to or larger than threshold value B2 (step S140). Here, the threshold value B2 is approximately set to a value representing a change of vehicle inclination that can occur during transportation on a ferry, for example, and is larger than the threshold values A and B1. If the change θ in the inclination of the vehicle is equal to or larger than the threshold value B2, the ECU 30 judges that large movement(s) or oscillation of the vehicle caused by, for example, transportation on a ferry is detected. In this case, step S170 and subsequent steps are executed, and one cycle of the control routine of FIG. 9 is finished.

If a negative decision (NO) is made in step S140, it is determined whether the change θ in the inclination of the vehicle is equal to or larger than the above-indicated threshold value A (step S150). If the change θ in the inclination of the vehicle is equal to or larger than the threshold value A, the ECU 30 generates a command for performing a warning operation to the alarm device 50 (step S160), and one cycle of the control routine of FIG. 9 is finished.

Figure 10:
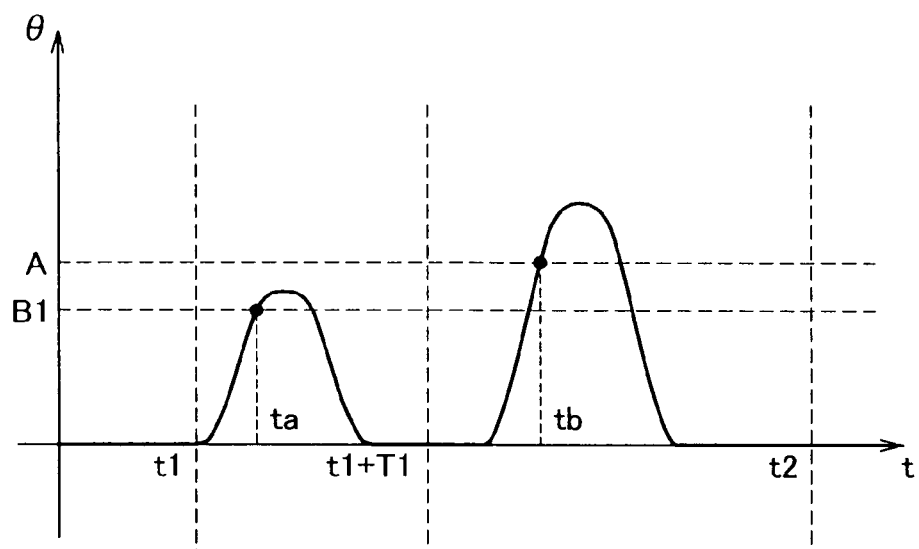
FIG. 10 is an explanatory view illustrating examples of the operation of the anti-theft security system of FIG. 8.
Figure 10:
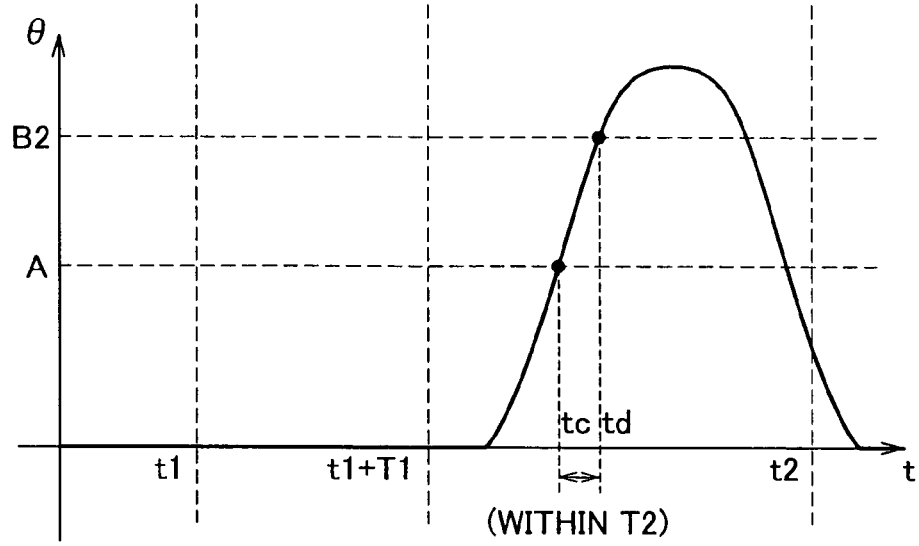

FIG. 10 illustrates examples of the operation of the vehicular anti-theft security system 20 of the third embodiment that implements the control routine of FIG. 9. More specifically, FIG. 10 indicates changes or variations in the change θ of the inclination of the vehicle with time. In FIG. 10, time t1 denotes a point of time at which the alert condition is established, and time t2 denotes a point of time at which the alert condition is released or cancelled.

In Ex. (1) of FIG. 10, the change θ in the inclination of the vehicle becomes equal to or larger than the threshold value B1 at time ta that is within a lapse of time T1 from t1. With this change θ detected, the ECU 30 judges that movement or oscillation of the vehicle during, for example, entry of the vehicle into a multi-level parking garage is detected (S130), and the restriction mode is set (S170). Subsequently, the change θ in the inclination of the vehicle becomes larger than the threshold value A at time tb, but no warning operation is performed (S120) since the restriction mode has been established. This arrangement also makes it possible to restrict or inhibit a warning operation that would be otherwise performed upon detection of movement of the vehicle at the time when the vehicle is taken out of the multi-level parking garage, for example.

In Ex. (2) of FIG. 10, the change θ in the inclination of the vehicle becomes larger than the threshold value A at time tc that comes after a lapse of time T1 from time t1, and a command for a warning operation is generated (S150, S160). However, the change θ in the inclination of the vehicle subsequently becomes equal to or larger than the threshold value B2 at time td within a lapse of T2 from time tc, and it is thus judged that large movements or oscillation of the vehicle due to, for example, transportation on a ferry, is detected (S140). In this case, a command for stopping the warning operation is generated (S170-S190), and the warning operation is not performed any longer.

While the threshold value B1 is smaller than the threshold value A in Ex. (1) of FIG. 10, the threshold value B1 may be larger than the threshold value A, as explained above. It is, however, to be noted that the threshold value B2 is larger than the threshold value A and the threshold value B1, in view of the nature of the invention.

Thus, the vehicular anti-theft security system 20 of the third embodiment of the invention is prevented from performing warning operations, without requiring an operation or manipulation by the user, when detecting movements of the vehicle during entry or release of the vehicle into or from a multi-level parking garage or during transportation on a ferry, for example.

It is to be understood that the invention is not limited to the details of the illustrated embodiment, but may be embodied with various changes, modifications or improvements, which may occur to those skilled in the art without departing from the spirit and scope of the invention.

In the illustrated embodiment, the ECU 30 compares the change θ in the inclination of the vehicle with the threshold values A, B1 and B2 so as to generate commands for warning operations or set the restriction mode, for example. However, the ECU may be configured to compare the acceleration α applied to the vehicle directly with certain threshold values so as to generate commands for warning operations or set the restriction mode, for example. While the change θ in the inclination of the vehicle is calculated based on the acceleration α received from the acceleration sensor, an inclination sensor may be employed which utilizes a gyro mechanism or a pendulum mechanism or which electrically detects the liquid-level displacement of a sealed-in fluid, for example.

While the direction of the inclination of the vehicle is not particularly mentioned in the illustrated embodiment, the inclination of the vehicle is determined in accordance with the direction of detection of the acceleration sensor 60. In the illustrated embodiment, for example, the use of the two-axis acceleration sensor 60 makes it possible to detect inclination in all directions, including the rolling direction and pitching direction of the vehicle, with respect to the horizontal plane. Accordingly, it is possible to set different values for each of the threshold values A, B1 and B2 with respect to the respective inclination components of the rolling direction and pitching direction, or set a single value for each of the threshold values A, B1 and B2 with respect to a composite component obtained by combining the inclination components of the rolling direction and pitching direction together.

Furthermore, the result of comparison of the change θ in the inclination of the vehicle with a threshold value or values may be used as a basis for generating commands for warning operations, while the result of comparison of the acceleration α with a threshold value or values may be used as a basis for setting the restriction mode. For example, the ECU 30 may compare the acceleration α, instead of the change θ in the inclination, with threshold values B1' and B2' that are approximately set to accelerations that can appear during entry or release of the vehicle into or from a multi-level parking garage and during transportation on a ferry, respectively, so as to make a determination as to whether the restriction mode is to be set in steps S130 and S140 of the control routine of FIG. 9, and may compare the change θ in the inclination with the threshold value A so as to make a determination as to whether a warning operation is performed in step S150 as in the above-described control routine. In this case, the change θ in the inclination may be obtained by using the output signal of the acceleration sensor 60, as in the illustrated embodiment, or by using an output signal of an inclination sensor provided separately from the acceleration sensor 60. With this arrangement, erroneous warning operations can be effectively prevented in the case where movement of the vehicle caused by an event other than theft is effectively detected through evaluation of the acceleration while movement of the vehicle caused by theft is effectively detected through evaluation of a change in the inclination of the vehicle.

In the control routine of the third embodiment as shown in FIG. 9, step S130 or step S140 may be eliminated. Namely, the restriction mode may be set only in the case where the change θ in the inclination of the vehicle becomes equal to or larger than the threshold value B1 within a lapse of time T1 from the time when the alert condition is established, or the restriction mode may be set only in the case where the change θ in the inclination of the vehicle becomes equal to or larger than the threshold value B2. With this arrangement, too, the anti-theft security system yields advantageous effects similar to those provided by the third embodiment.

The anti-theft security system of the invention may be employed in vehicles having any type of door lock and its release. In the illustrated embodiment, the ECU 30 judges that the vehicle is in the alert condition from the time when the door is locked from the outside of the vehicle by means of the lock switch 40 to the time when the door lock is released upon receipt of radio waves from the remote control key 42. It is, however, possible to lock the door and release the door lock by inserting an ordinary key into a key cylinder of the door, or operating a switch or switches that may be provided on the remote control key 42. Furthermore, the judgment as to whether the vehicle is in the alert condition may be made on the basis of an event or phenomenon other than door lock. For example, it may be judged that the alert condition is established, for example, when a parking brake is applied or when a certain time has passed since the ignition switch was turned off.

In another modified example, the anti-theft security system may not be provided with the theft detection sensor 70, and may perform warning operations solely on the basis of changes θ in the inclination of the vehicle. In this case, step S110 of the control routine of FIG. 9 may be eliminated.

It is to be understood that the invention may be applied to vehicular anti-theft security systems that perform warning operations on the basis of at least movements of the vehicle, and that the appearance, weight, size and running performance of the vehicle on which the system is installed are not limited.

Figure 11:
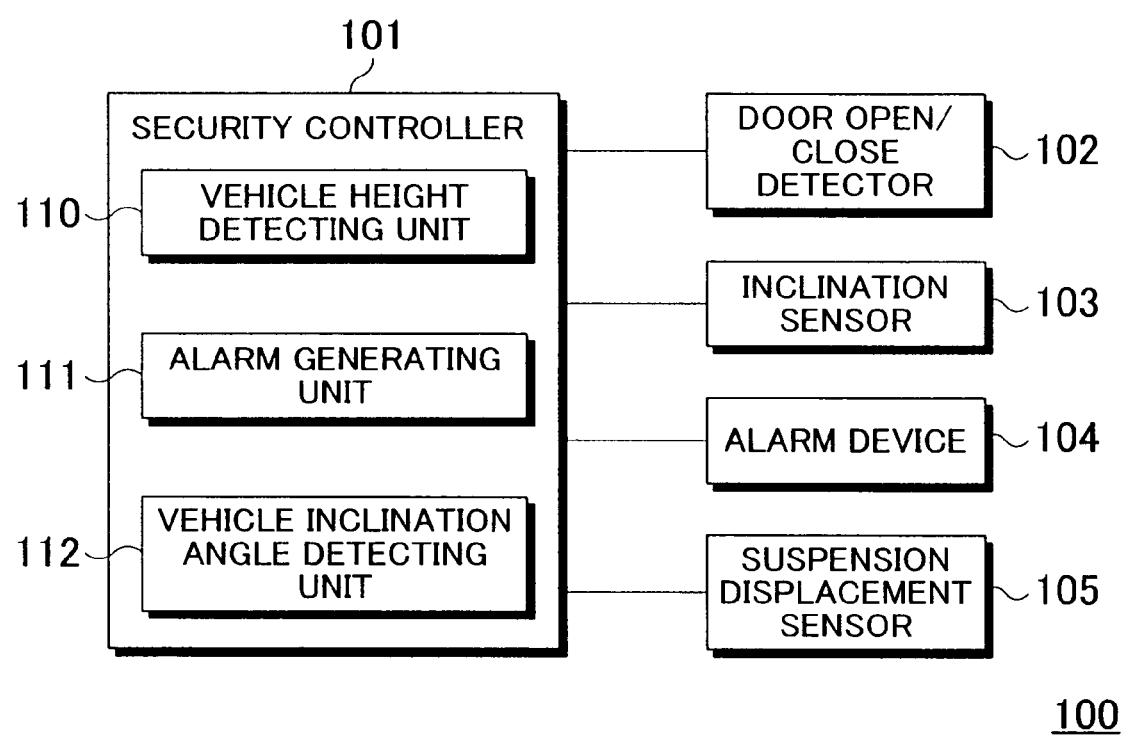
FIG. 11 is a block diagram of a vehicular anti-theft security system according to a fourth embodiment of the invention.

FIG. 11 illustrates a vehicular anti-theft security system constructed according to a fourth embodiment of the invention. The vehicular anti-theft security system 100 principally consists of a security controller 101, a door open/close detector 102, an inclination sensor 103, an alarm device 104 and a suspension displacement sensor 105.

The security controller 101 includes CPU (Central Processing Unit), ROM (Read Only Memory) and RAM (Random Access Memory), all of which are not shown, and has a vehicle height detecting unit 110, an alarm generating unit 111 and a vehicle inclination angle detecting unit 112. The security controller 101 causes RAM to retrieve programs stored in ROM, and causes CPU to implement the above-indicated units. The security controller 101 is connected to the door open/close detector 102, inclination sensor 103, alarm device 104 and the suspension displacement sensor 105.

The door open/close detector 102 detects the open or closed state of each of the doors of the vehicle, and transmits detection signals to the security controller 101.

The inclination sensor 103 is responsive to inclination of the vehicle caused by, for example, jack-up or towing, or movement (e.g., oscillation) of the vehicle, and detects the inclination or movement (e.g., oscillation) of the vehicle from a horizontal or vertical plane as a reference plane.

The alarm device 104 is adapted to generate sound or light for warning, and may be equipped with a transmitter for transmitting a signal to a remote control terminal, a cellular phone, or the like.

The suspension displacement sensor 105 measures changes in the height of the vehicle and the length of the suspension on the basis of, for example, changes in the length of a shock absorber or a coil spring, or changes in the pressure of an air suspension.

The vehicle height detecting unit 110 acquires information concerning expansion and contraction of each of the suspensions for the respective four wheels from the corresponding suspension displacement sensor 105, and detects the current one of the prescribed vehicle-height conditions (which will be described). The vehicle height detecting unit 110 may also detect the current one of the prescribed vehicle-height conditions based on, for example, information from other distance sensors using infrared radiation or ultrasound, or the selected position of a height adjustment switch of a vehicle-height control device provided in the vehicle compartment.

The "prescribed vehicle-height conditions" refer to vehicle heights that can be established by, for example, a height adjustment type suspension. For example, the prescribed vehicle-height conditions may consist of three levels, i.e., "HIGH" indicative of a large height, "NORMAL" indicative of a normal or standard height, and "LOW" indicative of a small height. The vehicle height detecting unit 110 may determine one of the vehicle-height conditions from, for example, expansion of the suspension. It is to be understood that the "prescribed vehicle-height conditions" may have three or more levels of height conditions, or may include inclined conditions as in the case where the front and rear suspensions on the right-hand side are expanded to a certain length, or the case where the front suspension on the left-hand side is expanded to a certain length, for example.

The alarm generating unit 111 transmits a signal to the alarm device 104 so as to cause the alarm device 104 to generate warning sound, or the like, based on signals from the door open/close detectors 102, or the results of detection of the height condition detecting unit 110 and the vehicle inclination angle detecting unit 112.

The vehicle inclination angle detecting unit 112 receives a signal from the inclination sensor 103 and detects inclination of the vehicle. The vehicle inclination angle detecting unit 112 detects inclination of the vehicle with respect to two axes, namely, in the longitudinal direction and lateral direction of the vehicle, but may detect inclination with respect to only one axis.

Figure 12:
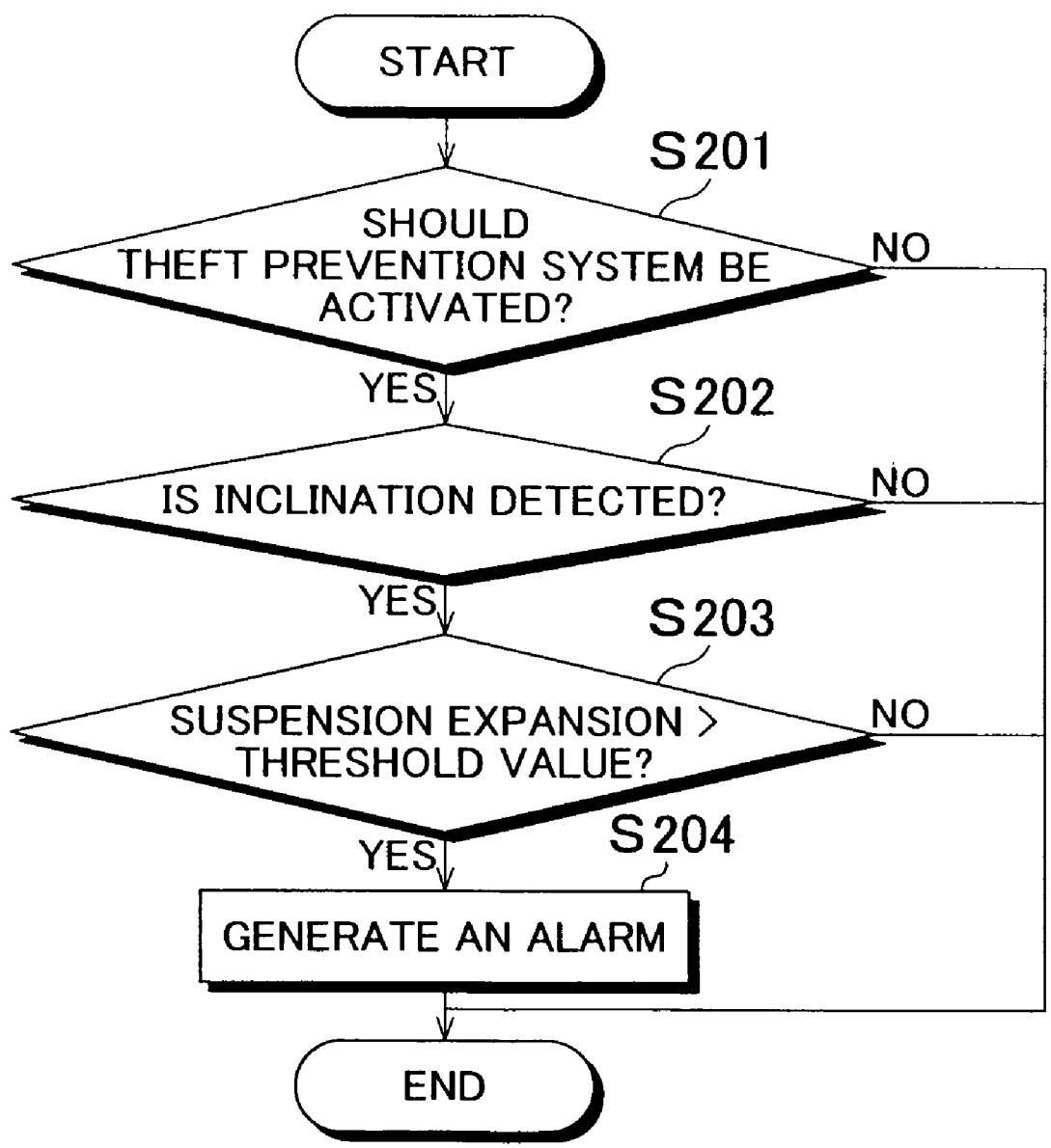
FIG. 12 is a flowchart illustrating the flow of a control process according to which the anti-theft security system of FIG. 11 generates an alarm.

Next, the operation of the vehicular anti-theft security system 100 will be explained. FIG. 12 is a flowchart illustrating the flow of a control process according to which the anti-theft security system 100 generates an alarm. Initially, the security controller 101 of the anti-theft security system 100 receives signals from the door open/close detectors 102, and determines whether the security system 100 actuates a theft prevention system based on the information as to whether all of the doors of the vehicle are locked (step S201). If all of the doors are locked (i.e., if an affirmative decision (YES) is made in step S201), the theft prevention system is actuated. The theft prevention system may also be actuated on the basis of information from an ignition switch or signals from the door open/close detectors and the ignition switch. If one or more of the doors are unlocked or the ignition switch is placed in the ON state (i.e., if a negative decision (NO) is made in step S201), the security controller 101 does not cause the theft prevention system to be actuated assuming that the driver is still in the neighborhood of the vehicle.

During operation of the theft prevention system, the security controller 101 monitors a signal from the inclination sensor 103 (step S202). If the vehicle inclination angle detecting unit 112 detects a specified inclination angle (i.e., if an affirmative decision (YES) is made in step S202), the security controller 101 determines whether the expansion of the suspension is equal to or larger than a threshold value (step S203). If the expansion of the suspension is equal to or larger than the threshold value (i.e., if an affirmative decision (YES) is made in step S203), the security controller 101 causes the alarm generating unit 111 to send a signal to the alarm device 104 so as to generate warning sound (step S204). If the expansion of the suspension is smaller than the threshold value (i.e., if a negative decision (NO) is made in step S203), the security controller 101 does not cause the alarm generating unit 111 to send a signal to the alarm device 104, assuming that the expansion of the suspension is not caused by jack-up, or the like, but may be caused by, for example, oscillation of the ground or strong wind. The above-indicated threshold value may be set in advance in view of the conditions, such as a vehicle-height condition, of the suspensions, and the threshold value thus set may be changed as needed. The specified inclination angle detected by the vehicle inclination angle detecting unit 112 may also be set or changed as needed, depending upon the conditions of the suspensions.

With the above arrangement, the anti-theft security system 100 is able to appropriately generate an alarm in the cases of vehicle theft, tire theft or vehicle-part theft involving, for example, jack-up or towing, while preventing the theft prevention system from being erroneously actuated upon detection of inclination of the vehicle due to an earthquake or strong wind or oscillation of the ground or platform during transportation on a ferry or parking in a multi-level parking garage, for example. Thus, the anti-theft security system 100 eliminates the need for the driver or user to manually turn off a switch of the theft prevention system when the vehicle is loaded onto the ferry or parked in the multi-level parking garage, and then turn on the switch of the theft prevention system again when it is needed, thus assuring improved convenience of the user. The security system 100 is also prevented from failing to actuate the theft prevention system when the system is needed.

Figure 13:
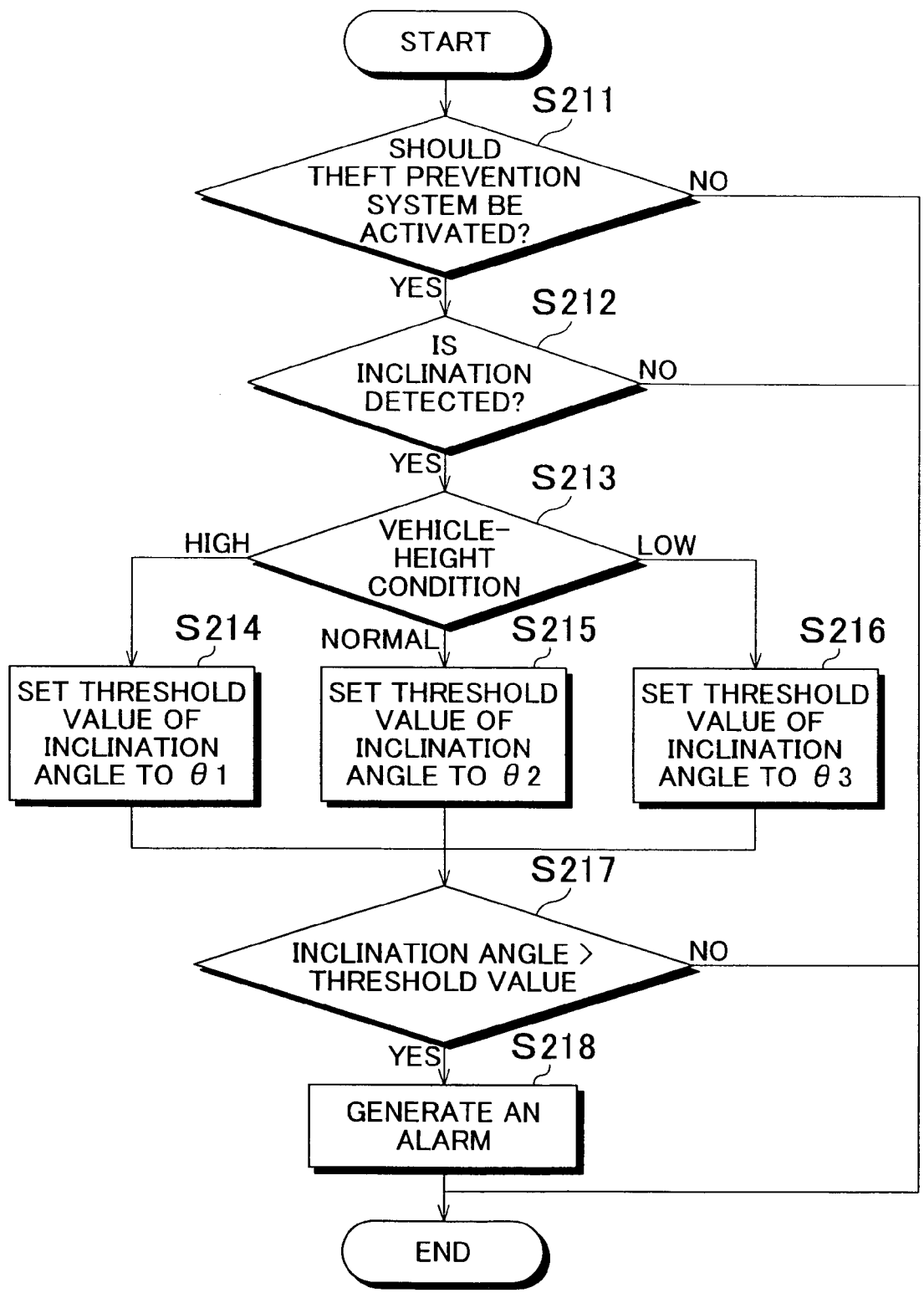
FIG. 13 is a flowchart illustrating the flow of another control process according to which the anti-theft security system of FIG. 11 generates an alarm.

FIG. 13 is a flowchart illustrating the flow of another control process according to which the anti-theft security system 100 generates an alarm. In particular, the control process of FIG. 13 is performed in a vehicle provided with a height adjustment type suspension system.

Step S211 and step S212 are identical with step S201 and step S202 of the control process shown in FIG. 12, and no explanation of steps S211, S212 is provided herein.

The security controller 101 determines the vehicle-height condition based on information from the suspension displacement sensor 105 (step S213). In this example, the vehicle-height condition is selected from three levels, i.e., "HIGH", "NORMAL" and "LOW".

If the security controller 101 determines from the degree of expansion of the suspension that the vehicle height is in the "HIGH" condition, the controller 101 sets a condition that "the inclination angle of the vehicle measured by the inclination sensor 103 is equal to or larger than $\theta 1$" as a condition under which the alarm generating unit 111 sends a signal to the alarm device 104 (step S214).

If the security controller 101 determines that the vehicle height is in the "NORMAL" condition, the controller 101 sets a condition that "the inclination of the vehicle measured by the inclination sensor 103 is equal to or larger than $\theta 2$" as a condition under which the alarm generating unit 111 sends a signal to the alarm device 104 (step S215). If the security controller 101 determines that the vehicle height is in the "LOW" condition, the controller 101 sets a condition that "the inclination of the vehicle measured by the inclination sensor 103 is equal to or larger than $\theta 3$" as a condition under which the alarm generating unit 111 sends a signal to the alarm device 104 (step S216). The threshold values $\theta 1$, $\theta 2$ and $\theta 3$ are determined so as to satisfy the relationship of $\theta 1 < \theta 2 < \theta 3$, in view of the properties of the suspension, as will be described in detail.

FIG. 14 is a table that indicates the relationship between the vehicle-height condition, and the displacement of the suspension and the angle of inclination of the vehicle required for lifting a tire off the ground upon jack-up.

In FIG. 14, column 220 labeled "VEHICLE-HEIGHT CONDITION" has three conditions, namely, "HIGH", "NORMAL" and "LOW". Column 221 labeled "DISPLACEMENT OF SUSPENSION FOR LIFTING OF TIRE UPON JACK-UP" indicates the displacement of the suspension required for lifting a tire off the ground in each of the vehicle-height conditions, the displacement being selected from three levels of "LARGE", "MEDIUM" and "SMALL". Column 222 labeled "VEHICLE INCLINATION ANGLE FOR LIFTING OF TIRE UPON JACK-UP" indicates the angle of inclination of the vehicle required for lifting a tire off the ground in each of the vehicle-height conditions, the inclination angle being selected from three levels "LARGE", "MEDIUM" and "SMALL". The displacement of the suspension for lifting of a tire upon jack-up and the vehicle inclination angle for lifting of a tire upon jack-up are the smallest among the three vehicle-height conditions when the vehicle-height condition is "HIGH", and the displacement of the suspension for lifting of a tire upon jack-up and the vehicle inclination angle for lifting of a tire upon jack-up are the largest among the three vehicle-height conditions when the vehicle-height condition is "LOW". In FIG. 14, column 223 labeled "INCLINATION ANGLE (THRESHOLD VALUE) AS A BASIS FOR ALARM GENERATION" indicates a threshold value of the inclination angle based on which an alarm is generated in each of the vehicle-height conditions. When the vehicle-height condition is "HIGH", the threshold value of the inclination angle is equal to $\theta 1$, which is the smallest angle among the three vehicle-height conditions. When the vehicle-height condition is "LOW", the threshold value of the inclination angle is equal to $\theta 3$, which is the largest angle among the three vehicle-height conditions. While the threshold value of the inclination angle is equal to the largest angle $\theta 3$ among the three vehicle-height conditions when the height condition is "LOW", the angle $\theta 3$ is still smaller than the angle of inclination detected when the shock absorber is at full stroke in the "LOW" condition. Thus, the anti-theft security system 100 of this embodiment can appropriately actuate the alarm device 104 upon occurrence of theft, while surely preventing erroneous actuation of the alarm device 104.

When the height adjustment type suspension system is set or adjusted so that the vehicle is in the "HIGH" vehicle-height condition, the shock absorber of each suspension is in an expanded condition in a steady state (1 G state) as compared with a normal condition, and is easily brought into a full-stroke condition through jack-up. In this condition, therefore, the displacement of the suspension required for lifting of a tire upon jack-up is small, and the vehicle inclination angle required for lifting of a tire upon jack-up is accordingly small. When the suspension system is set or adjusted so that the vehicle is in the "LOW" vehicle-height condition, on the other hand, the shock absorber is in a contracted condition in the steady state as compared with the normal condition, and the expansion of the suspension needed to reach the full-stroke condition is larger than that of the case where the vehicle-height condition is "NORMAL" or "HIGH". In this condition, therefore, the displacement of the suspension required for lifting a tire upon jack-up is large, and the vehicle inclination angle required for lifting a tire upon jack-up is accordingly large.

In the case where the vehicle-height condition is "NORMAL" or "LOW", the vehicle must be inclined by a larger degree for lifting a tire off the ground, as compared with the case where the height condition is "HIGH". In the case of the "NORMAL" or "LOW" condition, therefore, the angle of inclination of the vehicle, which provides a condition for generating an alarm, is set to a larger value than that in the case of the "HIGH" condition, so that erroneous actuation of the alarm device 204 can be prevented with improved reliability.

While the vehicle-height condition is selected from three levels, i.e., "HIGH", "NORMAL" and "LOW" in the illustrated embodiment, the height condition may be selected from two levels, or four or more levels.

Figure 15:
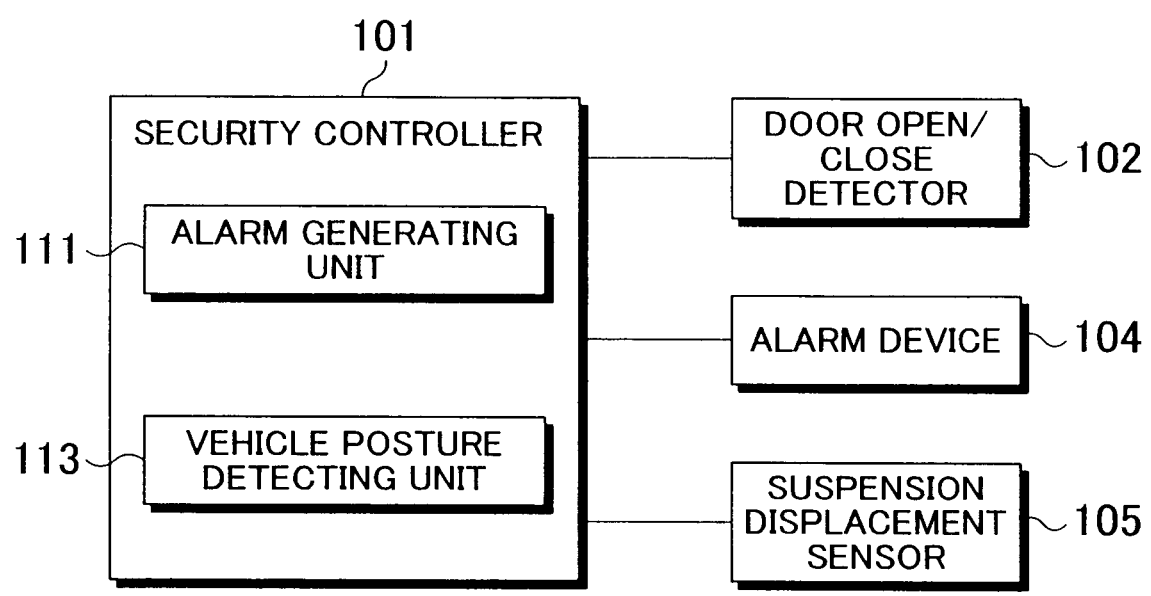
FIG. 15 is a block diagram of a vehicular anti-theft security system according to a fifth embodiment of the invention.

FIG. 15 shows a vehicular anti-theft security system 200 constructed according to a fifth embodiment of the invention. In FIG. 15, the same reference numerals as used in FIG. 11 are used for identifying constituent elements that are identical with those of the vehicular anti-theft security system 100.

The vehicular anti-theft security system 200 principally consists of a security controller 101, a door open/close detector 102, an alarm device 104 and a suspension displacement sensor 105. The security controller 101 has an alarm generating unit 111 and a vehicle posture detecting unit 113.

In the anti-theft security system 100 of the fourth embodiment, the alarm device 104 generates an alarm when the vehicle inclination angle detecting unit 112 detects a vehicle inclination angle that exceeds a threshold value based on the information from the inclination sensor 103. On the other hand, the anti-theft security system 200 of the fifth embodiment generates an alarm when detecting certain vehicle-height condition and vehicle inclination angle by use of the suspension displacement sensor 105, without using the inclination sensor 103 as used in the fourth embodiment.

The vehicle posture detecting unit 113 acquires information concerning expansion or contraction of each of the suspensions for the four wheels of the vehicle, from the suspension displacement sensor 105 provided for each suspension, so as to detect the vehicle posture and the vehicle-height condition.

Here, the "vehicle posture" refers to the angle of inclination of the vehicle, or the like, which is determined from the expansion or contraction of the suspensions for the respective four wheels. For example, if the suspensions for the front wheels are contracted to be shorter than a reference length, or the suspensions for the rear wheels are expanded to be longer than the reference length, the vehicle posture detecting unit 113 judges that the front part of the vehicle is pushed down with a certain inclination angle, or the rear part of the vehicle is lifted up with a certain inclination angle. If the suspensions for the right-side front and rear wheels are contracted to be shorter than the reference length, or the suspensions of the left-side front and rear wheels are expanded to be longer than the reference length, the vehicle posture detecting unit 113 judges that the right-hand side of the vehicle is pushed down with a certain inclination angle, or the left-hand side of the vehicle is lifted up with a certain inclination angle. The "reference length" as indicated above refers to the length of the suspension detected when the vehicle is not inclined (all of the suspensions being subject to 1 G) in the vehicle-height condition established by the height adjustment type suspension system, or the length of the suspension detected when the vehicle is parked.

The alarm generating unit 111 sends a signal to the alarm device 104 based on a signal from the door open/close detector 102 and the result of detection of the vehicle posture detecting unit 113, so as to operate the alarm device 104 to generate warning sound, or the like.

It is to be understood that the invention is not limited to the details of the illustrated embodiment, but may be embodied with various changes, modifications or improvements, which may occur to those skilled in the art without departing from the spirit and scope of the invention.

While the inclination of the vehicle by a specified inclination angle provides a condition for generating an alarm in the illustrated embodiment, the length of time for which the vehicle is kept being inclined by the specified angle or more may be taken into consideration, as another condition for generating an alarm, so that the alarm device is prevented from being actuated by mistake due to temporary or brief inclination that occurs, for example, on a ferry.

What is claimed is:

1. A vehicular anti-theft security system which includes a theft detector that detects an abnormality of a vehicle associated with vehicle theft, and performs a theft preventing operation when the theft detector detects the abnormality, comprising:
    an altitude measuring device that measures an altitude of the vehicle; and
    a controller that restricts the theft preventing operation in the case where the altitude measuring device observes a specified change in the altitude of the vehicle within a specified period of time when the theft detector detects the abnormality.

2. The vehicular anti-theft security system as defined in claim 1, wherein the theft detector comprises an inclination detector that detects an inclination of the vehicle.

3. The vehicular anti-theft security system as defined in claim 2, wherein the theft detector comprises a moving-body detector that detects an object that moves in a vehicle compartment.

4. The vehicular anti-theft security system as defined in claim 1, wherein the theft detector comprises a moving-body detector that detects an object that moves in a vehicle compartment.

5. The vehicular anti-theft security system as defined in claim 1, wherein:
    the controller determines whether an alert mode is set in which the vehicle is on the alert for vehicle theft; and
    if the altitude measuring device observes the specified change in the altitude of the vehicle within the specified period of time while the alert mode is set, the controller ignores detection by the theft detector until the alert mode is reset.

6. A vehicular anti-theft security system which includes a sensor that detects movement of a vehicle, and performs a theft preventing operation when the sensor detects the movement of the vehicle during parking of the vehicle, comprising:
    a rotation detector that detects rotation of the vehicle in a yawing direction; and
    a controller that restricts the theft preventing operation in the case where the rotation detector detects a rotational state of the vehicle when the sensor detects the movement of the vehicle during parking of the vehicle.

7. The vehicle anti-theft security system as defined in claim 6, wherein the sensor comprises an inclination detector that detects an inclination of the vehicle.

8. The vehicle anti-theft security system as defined in claim 6, wherein:
    the controller determines whether an alert mode is set in which the vehicle is on the alert for vehicle theft; and
    if the rotation detector detects the rotational state of the vehicle while the alert mode is set, the controller ignores detection by the sensor until the alert mode is reset.

9. A vehicular anti-theft security system, comprising:
    a detector that detects movement of a vehicle;
    a warning device that performs a warning operation associated with a state of the vehicle; and
    a controller that:
    determines whether an alert condition is established in which the vehicle is on the alert for theft;
    causes the warning device to perform the warning operation based on the movement of the vehicle while the vehicle is in the alert condition; and
    inhibits the warning device from performing the warning operation based on the movement of the vehicle detected by the detector when the movement of the vehicle becomes equal to or larger than a predetermined value during a period between a first point of time at which the controller determines establishment of the alert condition and a second point of time at which a first predetermined time elapses from the first point of time.

10. The vehicular anti-theft security system as defined in claim 9, wherein the detector detects inclination of the vehicle as the movement of the vehicle.

11. The vehicular anti-theft security system as defined in claim 9, wherein the detector detects an acceleration of the vehicle as the movement of the vehicle.

12. The vehicular anti-theft security system as defined in claim 9, wherein the controller determines that the alert condition is established when no passenger exists in a vehicle compartment.

13. The vehicular anti-theft security system as defined in claim 9, wherein the warning device performs the warning operation by providing information on the position of the vehicle through the use of GPS.

14. A vehicular anti-theft security system, comprising:
a detector that detects movement of a vehicle;
a warning device that performs a warning operation associated with a state of the vehicle; and
a controller that:
determines whether an alert condition is established in which the vehicle is on the alert for theft;
causes the warning device to perform the warning operation based on the movement of the vehicle while the vehicle is in the alert condition; and
inhibits the warning device from performing the warning operation based on the movement of the vehicle detected by the detector when the movement of the vehicle becomes equal to or larger than a predetermined value that is larger than the movement of the vehicle based on which the warning operation is performed.

15. The vehicular anti-theft security system as defined in claim 14, wherein the detector detects inclination of the vehicle as the movement of the vehicle.

16. The vehicular anti-theft security system as defined in claim 14, wherein the detector detects an acceleration of the vehicle as the movement of the vehicle.

17. The vehicular anti-theft security system as defined in claim 14, wherein:
the detector detects inclination of the vehicle as the movement of the vehicle; and
the controller stops the warning operation based on the inclination of the vehicle detected by the detector when the inclination of the vehicle becomes equal to or larger than the predetermined value, when a second predetermined time has elapsed since the inclination of the vehicle detected by the detector has reached the inclination of the vehicle on which the warning operation is performed.

18. The vehicular anti-theft security system as defined in claim 14, wherein the controller determines that the alert condition is established when no passenger exists in a vehicle compartment.

19. The vehicular anti-theft security system as defined in claim 14, wherein the warning device performs the warning operation by providing information on the position of the vehicle through the use of GPS.

20. A vehicular anti-theft security system, comprising:
an acceleration sensor that detects an acceleration of a vehicle;
an inclination sensor that detects an inclination of the vehicle;
a warning device that performs a warning operation associated with a state of the vehicle; and
a controller that:
determines whether an alert condition is established in which the vehicle is on the alert for theft;
causes the warning device to perform the warning operation based on the inclination of the vehicle while the vehicle is in the alert condition; and
inhibits the warning device from performing the warning operation based on the inclination of the vehicle when the acceleration of the vehicle detected by the acceleration sensor becomes equal to or larger than a predetermined value during a period between a first point of time at which the controller determines establishment of the alert condition and a second point of time at which a first predetermined time elapses from the first point of time.

21. The vehicular anti-theft security system as defined in claim 20, wherein the controller determines that the alert condition is established when no passenger exists in a vehicle compartment.

22. The vehicular anti-theft security system as defined in claim 20, wherein the warning device performs the warning operation by providing information on the position of the vehicle through the use of GPS.

23. A vehicular anti-theft security system, comprising:
an acceleration sensor that detects an acceleration of a vehicle;
an inclination sensor that detects an inclination of the vehicle;
a warning device that performs a warning operation associated with a state of the vehicle; and
a controller that:
determines whether an alert condition is established in which the vehicle is on the alert for theft;
causes the warning device to perform the warning operation based on the inclination of the vehicle while the vehicle is in the alert condition; and
inhibits the warning device from performing the warning operation based on the inclination of the vehicle when the acceleration of the vehicle detected by the acceleration sensor becomes equal to or larger than a predetermined value.

24. The vehicular anti-theft security system as defined in claim 23, wherein the controller determines that the alert condition is established when no passenger exists in a vehicle compartment.

25. The vehicular anti-theft security system as defined in claim 23, wherein the warning device performs the warning operation by providing information on the position of the vehicle through the use of GPS.

26. A vehicular anti-theft security system, comprising:
a vehicle-height condition detector that detects a vehicle-height condition of the body of the vehicle from a surface supporting at least one wheel of the vehicle;
a vehicle inclination angle detector that detects an angle of inclination of the vehicle; and
an alarm generating device that generates an alarm when the vehicle-height condition detector detects one selected from two or more prescribed vehicle-height conditions, and the vehicle inclination angle detector detects a specified angle of inclination of the vehicle.

27. The vehicular anti-theft security system as defined in claim 26, wherein the vehicle-height condition detector detects one of the prescribed vehicle-height conditions based on expansion or contraction of a suspension for each wheel.

28. The vehicular anti-theft security system as defined in claim 27, wherein the specified angle of inclination of the vehicle is set based on the detected one of the prescribed vehicle-height conditions which is detected by the vehicle-height condition detector.

29. The vehicular anti-theft security system as defined in claim 26, wherein the specified angle of inclination of the vehicle is set based on the detected one of the prescribed vehicle-height conditions which is detected by the vehicle-height condition detector.

30. A vehicular anti-theft security system, comprising:
a vehicle-height condition detector that detects a vehicle-height condition of the body of the vehicle from a surface supporting at least one wheel of the vehicle;
a vehicle inclination angle detector that detects an angle of inclination of the vehicle; and
an alarm generating device that generates an alarm when the angle of inclination of the vehicle detected by the vehicle inclination angle detector is equal to or larger than a threshold value that is determined based on the vehicle-height condition detected by the vehicle-height condition detector.

31. A vehicular anti-theft security system, comprising:
a vehicle posture detector that detects an angle of inclination of the vehicle and a vehicle-height condition of the body of the vehicle from a surface supporting at least one wheel of the vehicle based on expansion or contraction of a suspension for each wheel; and
an alarm generating device that generates an alarm when the vehicle posture detector detects one selected from two or more prescribed vehicle-height conditions and a specified angle of inclination of the vehicle.

* * * * *